United States Patent
Kawamura et al.

(10) Patent No.: US 9,942,563 B2
(45) Date of Patent: Apr. 10, 2018

(54) VIDEO ENCODING USING SUBSAMPLING TO REDUCE NUMBER OF REFERENCE PIXELS

(71) Applicant: KDDI CORPORATION, Tokyo (JP)

(72) Inventors: Kei Kawamura, Tokyo (JP); Sei Naito, Saitama (JP)

(73) Assignee: KDDI CORPORATION, Tokyo (JP)

( * ) Notice: Subject to any disclaimer, the term of this patent is extended or adjusted under 35 U.S.C. 154(b) by 217 days.

(21) Appl. No.: 14/779,838

(22) PCT Filed: Mar. 25, 2014

(86) PCT No.: PCT/JP2014/058223
§ 371 (c)(1),
(2) Date: Sep. 24, 2015

(87) PCT Pub. No.: WO2014/157166
PCT Pub. Date: Oct. 2, 2014

(65) Prior Publication Data
US 2016/0065988 A1   Mar. 3, 2016

(30) Foreign Application Priority Data
Mar. 28, 2013   (JP) .................................. 2013-070215

(51) Int. Cl.
*H04N 19/59*   (2014.01)
*H04N 19/119*   (2014.01)
(Continued)

(52) U.S. Cl.
CPC .......... *H04N 19/59* (2014.11); *H04N 9/8045* (2013.01); *H04N 19/105* (2014.11);
(Continued)

(58) Field of Classification Search
None
See application file for complete search history.

(56) References Cited

U.S. PATENT DOCUMENTS

2005/0271288 A1*  12/2005  Suzuki ................. H04N 11/044
                                                   382/239
2013/0051469 A1*   2/2013  Park ..................... H04N 19/159
                                                  375/240.14
(Continued)

FOREIGN PATENT DOCUMENTS

| JP | 2013-34163 A | 2/2013 |
|---|---|---|
| WO | 2007/148619 A1 | 12/2007 |
| WO | 2012165040 A1 | 12/2012 |

OTHER PUBLICATIONS

Kawamura K et al: "Non-RCE1: Chroma intraprediction with mode-dependent reduced reference",14. JCT-VC Meeting; Jul. 25, 2013-Aug. 2, 2013; Vienna; (Joint Collaborative Team on Video Coding of ISO /IEC JTC1/SC29/WG11 and ITU-T SG.16) ; URL: http://wftp3.itu.int/av-arch/jctv-site/, No. JCTVC-NO368-v2, Jul. 28, 2013, XP030114920, pp. 1-5.
(Continued)

*Primary Examiner* — David N Werner
(74) *Attorney, Agent, or Firm* — BainwoodHuang

(57) ABSTRACT

An intra prediction unit that performs intra-frame prediction includes a luminance reference pixel acquisition unit and a chrominance reference pixel acquisition unit. When the coding unit is set to a smallest CU block, the luminance reference pixel acquisition unit subsamples reference pixels arranged at integer pixel locates neighboring a luminance block that corresponds to a chrominance prediction target block, and acquires the pixel values of the reference pixels after the subsampling. Furthermore, when the coding unit is set to a smallest CU block, the chrominance reference pixel acquisition unit subsamples reference pixels arranged at integer pixel locates neighboring the chrominance prediction target block, and acquires the pixel values of the reference pixels after the subsampling. Such an arrangement
(Continued)

is capable of reducing the number of reference pixels used to reduce the redundancy between the color components.

10 Claims, 16 Drawing Sheets

(51) Int. Cl.
  *H04N 9/804* (2006.01)
  *H04N 19/157* (2014.01)
  *H04N 19/105* (2014.01)
  *H04N 19/44* (2014.01)
  *H04N 19/182* (2014.01)
  *H04N 19/583* (2014.01)
  *H04N 19/186* (2014.01)
  *H04N 19/593* (2014.01)
  *H04N 19/122* (2014.01)
  *H04N 19/176* (2014.01)

(52) U.S. Cl.
  CPC ......... *H04N 19/119* (2014.11); *H04N 19/157* (2014.11); *H04N 19/182* (2014.11); *H04N 19/186* (2014.11); *H04N 19/44* (2014.11); *H04N 19/593* (2014.11); *H04N 19/122* (2014.11); *H04N 19/176* (2014.11)

(56) References Cited

U.S. PATENT DOCUMENTS

| | | | | |
|---|---|---|---|---|
| 2014/0003512 | A1* | 1/2014 | Sato | H04N 19/00569 375/240.12 |
| 2014/0010293 | A1* | 1/2014 | Srinivasan | H04N 19/119 375/240.12 |
| 2014/0134142 | A1* | 5/2014 | Smith | C12N 5/0636 424/93.21 |
| 2015/0043641 | A1* | 2/2015 | Gamei | H04N 19/122 375/240.12 |
| 2015/0124868 | A1* | 5/2015 | Kim | H04N 19/139 375/240.02 |
| 2016/0119631 | A1* | 4/2016 | Kawamura | H04N 19/59 375/240.12 |

OTHER PUBLICATIONS

Gisquet, Christophe, et al., "Border Subsampling for LM Mode", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, JCTVC-I0187, URL: http://phenix.it-sudparis.eu/jct/doc_end_user/documents/9_Geneva/wg11/Jctvc-I0187-v2.zip, pp. 2-9, Apr. 16, 2012.

International Search Report for International Application No. PCT/JP2014/058223 mailed from the Japanese Patent Office dated Jun. 24, 2014, 3 pages.

Bross et al., "High Efficiency Video Coding (HEVC) Text Specification Draft 10 (for FDIS & Last Call)" Joint Collaborative Team on Video Coding (JCT-VC) of ITU-T SG 16 WP3 and ISO/IEC JTC1/SC 29/WG11, 12th Meeting, Jan. 2013, Geneva, CH, pp. 14-23.

Budagavi et al., "CE6.a: Sub-Sampling Portion of Neighboring Pixels in Calculation of LM Parameters", Joint Collaborative Team on Video Coding (JCT-VC) of ITU-T SG 16 WP3 and ISO/IEC JTC1/SC 29/WG11, 7th Meeting, Nov. 2011, Geneva, CH, pp. 21-30.

Kawamura et al., " AHG5: Cu Based Chroma Intra Prediction with Reduced Reference", Joint Collaborative Team on Video Coding (JCT-VC) of ITU-T SG 16 WP3 and ISO/IEC JTC1/SC 29/WG11, 13th Meeting, Incheon, KR, Apr. 2013, pp. 18-26.

Kim et al., "AHG7: The Performance of Extended Intra Chroma Prediction for Non 4:2:0 Format", Joint Collaborative Team on Video Coding (JCT-VC) of ITU-T SG 16 WP3 and ISO/IEC JTC1/SC 29/WG11, 12th Meeting, Geneva, CH, Jan. 2013, pp. 14-23.

Sato, Kazushi, "Complexity Reduction of Chroma Intra Prediction by Reconstructed Luma Samples", Joint Collaborative Team on Video Coding (JCT-VC) of ITU-T SG 16 WP3 and ISO/IEC JTC1/SC 29/WG11, 6th Meeting, Torino, IT, Jul. 2011, pp. 14-22.

* cited by examiner

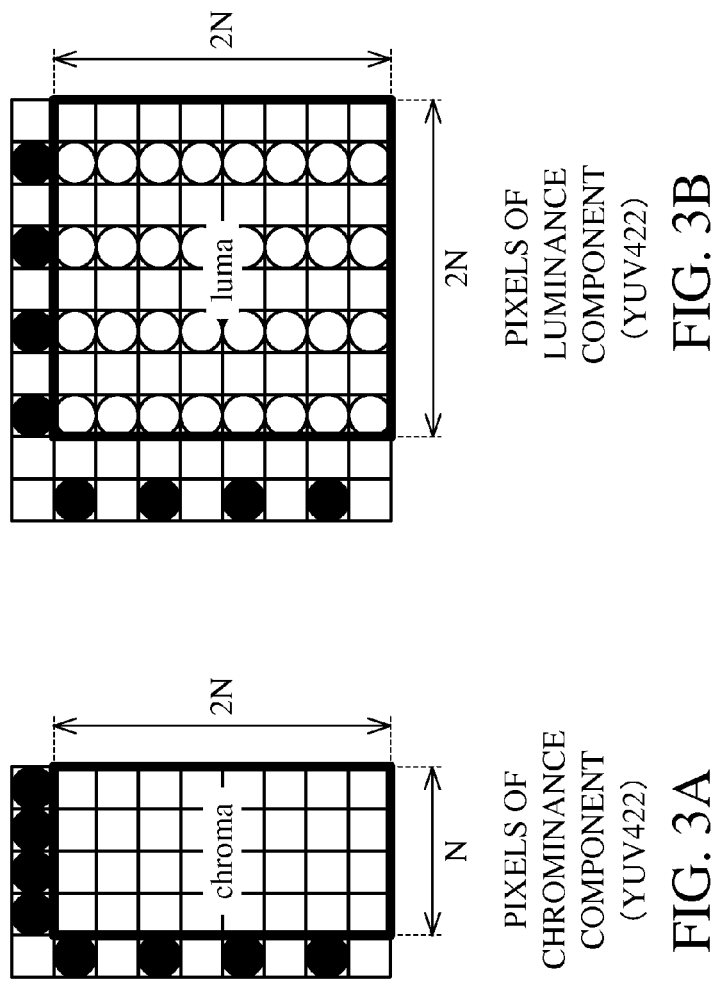

PIXELS OF LUMINANCE COMPONENT (YUV444)

PIXELS OF CHROMINANCE COMPONENT (YUV444)

| | FIRST EMBODIMENT OF PRESENT INVENTION | | | CU BASED | |
|---|---|---|---|---|---|
| COLOR FORMAT | NUMBER OF TIMES OF CALCULATION | NUMBER OF LUMINANCE REFERENCE PIXELS | NUMBER OF CHROMINANCE REFERENCE PIXELS | NUMBER OF TIMES OF CALCULATION | NUMBER OF LUMINANCE REFERENCE PIXELS | NUMBER OF CHROMINANCE REFERENCE PIXELS |
| YUV420 | 8×8=64 | 12 | 8 | 8×8=64 | 12 | 8 |
| YUV422 | 8×8=64 | 8 | 8 | 8×8=64 | 12 | 12 |
| YUV444 | 8×8=64 | 8 | 8 | 8×8=64 | 16 | 16 |

FIG. 5

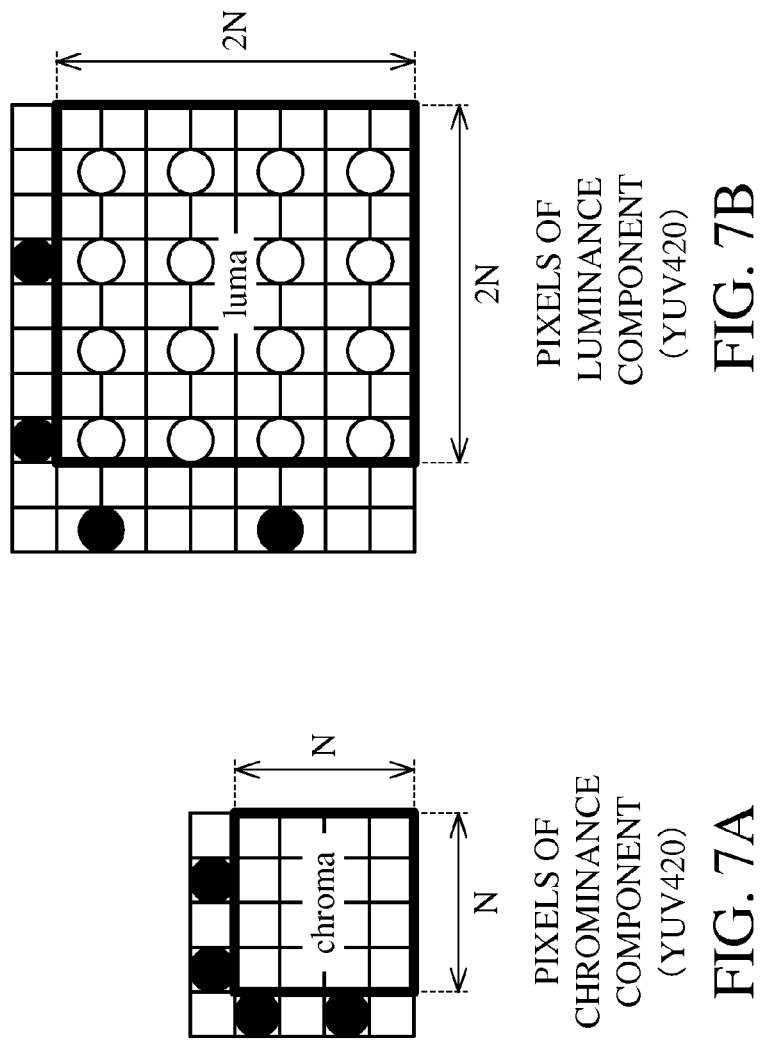

PIXELS OF LUMINANCE COMPONENT (YUV422)

PIXELS OF CHROMINANCE COMPONENT (YUV422)

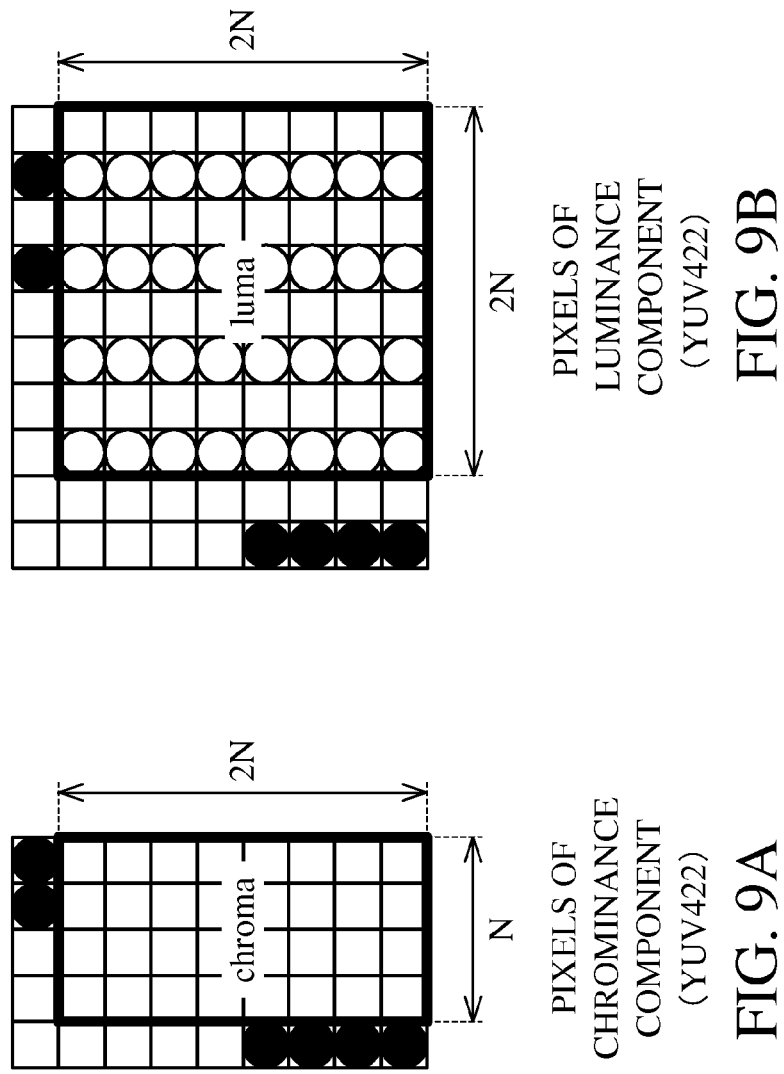
FIG. 9A  PIXELS OF CHROMINANCE COMPONENT (YUV422)
FIG. 9B  PIXELS OF LUMINANCE COMPONENT (YUV422)

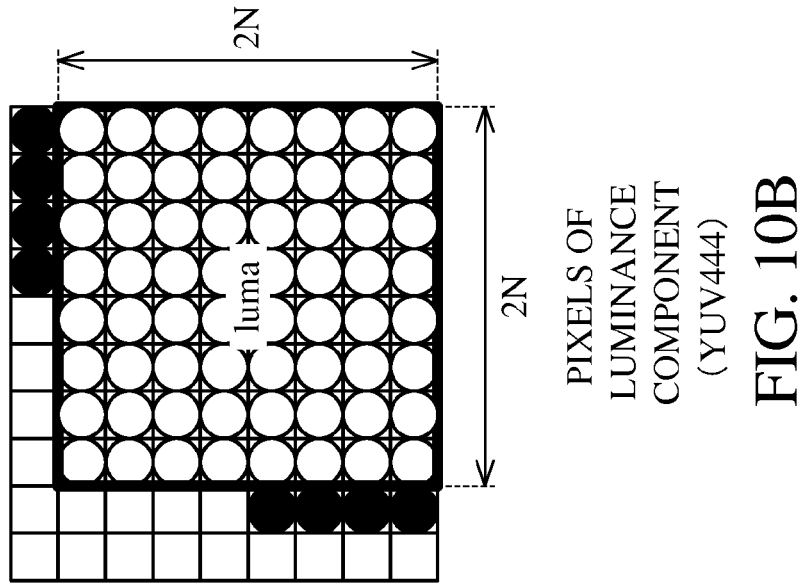
FIG. 10B PIXELS OF LUMINANCE COMPONENT (YUV444)
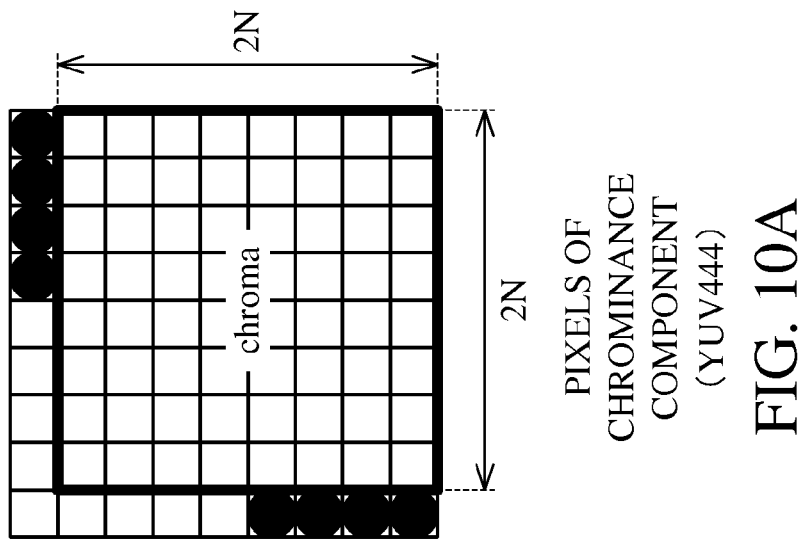
FIG. 10A PIXELS OF CHROMINANCE COMPONENT (YUV444)

|  | TU BASIS | | | CU BASED | | |
| --- | --- | --- | --- | --- | --- | --- |
| COLOR FORMAT | NUMBER OF TIMES OF CALCULATION | NUMBER OF LUMINANCE REFERENCE PIXELS | NUMBER OF CHROMINANCE REFERENCE PIXELS | NUMBER OF TIMES OF CALCULATION | NUMBER OF LUMINANCE REFERENCE PIXELS | NUMBER OF CHROMINANCE REFERENCE PIXELS |
| YUV420 | 8×8=64 | 12 | 8 | 8×8=64 | 12 | 8 |
| YUV422 | 16×8=128 | 16 | 16 | 8×8=64 | 12 | 12 |
| YUV444 | 16×16=256 | 8 | 8 | 8×8=64 | 16 | 16 |

FIG. 16
PRIOR ART

VIDEO ENCODING USING SUBSAMPLING TO REDUCE NUMBER OF REFERENCE PIXELS

TECHNICAL FIELD

The present invention relates to a video encoding apparatus, a video decoding apparatus, a video encoding method, a video decoding method, and a computer program.

BACKGROUND ART

As a video coding method using intra prediction, inter prediction, and residual transform, HEVC (High Efficiency Video Coding) has been proposed (see Non-patent document 1, for example).

[Configuration and Operation of Video Encoding Apparatus MM]

FIG. 11 is a block diagram showing a video encoding apparatus MM according to a conventional example configured to encode a video using the aforementioned video coding method. The video encoding apparatus MM includes an inter prediction unit 10, an intra prediction unit 20, a transform/quantization unit 30, an entropy encoding unit 40, an inverse quantization/inverse transform unit 50, an in-loop filtering unit 60, a first buffer unit 70, and a second buffer unit 80.

The inter prediction unit 10 receives, as its input data, an input video a and a local decoded image g supplied from the first buffer unit 70 as described later. The inter prediction unit 10 performs inter prediction (inter-frame prediction) based on the input video a and the local decoded image g so as to generate and output an inter predicted image b.

The intra prediction unit 20 receives, as its input data, the input video a and a local decoded image f supplied from the second buffer unit 80 as described later. The intra prediction unit 20 performs intra prediction (intra-frame prediction) based on the input video a and the local decoded image f so as to generate and output an intra predicted image c.

The transform/quantization unit 30 receives, as its input data, the input video a and an error (residual) signal which represents a difference between the input video a and the inter predicted image b or otherwise the intra predicted image c. The transform/quantization unit 30 transforms and quantizes the residual signal thus input so as to generate and output a quantized coefficient d.

The entropy encoding unit 40 receives, as its input data, the quantized coefficient d and unshown side information. The entropy encoding unit 40 performs entropy encoding of the input signal, and outputs the signal thus entropy encoded as a bit stream z.

The inverse quantization/inverse transform unit 50 receives the quantized coefficient d as its input data. The inverse quantization/inverse transform unit 50 performs inverse quantization processing and inverse transform processing on the quantized coefficient d so as to generate and output a residual signal e thus inverse transformed.

The second buffer unit 80 stores the local decoded image f, and supplies the local decoded image f thus stored to the intra prediction unit 20 and the in-loop filtering unit 60 at an appropriate timing. The local decoded image f is configured as a signal obtained by making the sum of the residual signal e thus inverse transformed and the inter predicted image or otherwise the intra predicted image c.

The in-loop filtering unit 60 receives the local decoded image f as its input data. The in-loop filtering unit 60 applies filtering such as deblock filtering or the like to the local decoded image f so as to generate and output a local decoded image g.

The first buffer unit 70 stores the local decoded image g, and supplies the local decoded image g thus stored to the inter prediction unit 10 at an appropriate timing.

[Configuration and Operation of Video Decoding Apparatus NN]

FIG. 12 is a block diagram showing a video decoding apparatus NN according to a conventional example, configured to decode a video based on the bit stream z generated by the video encoding apparatus MM. The video decoding apparatus NN comprises an entropy decoding unit 110, an inverse transform/inverse quantization unit 120, an inter prediction unit 130, an intra prediction unit 140, an in-loop filtering unit 150, a first buffer unit 160, and a second buffer unit 170.

The entropy decoding unit 110 receives the bit stream z as its input data. The entropy decoding unit 110 performs entropy decoding of the bit stream z so as to generate and output a quantized coefficient B.

The inverse transform/inverse quantization unit 120, the inter prediction unit 130, the intra prediction unit 140, the in-loop filtering unit 150, the first buffer unit 160, and the second buffer unit 170 respectively operate in the same manner as the inverse quantization/inverse transform unit 50, the inter prediction unit 10, the intra prediction unit 20, the in-loop filtering unit 60, the first buffer unit 70, and the second buffer unit 80.

[Detailed Description of Intra Prediction]

Detailed description will be made below regarding the aforementioned intra prediction. Intra prediction is described in Non-patent document 1 in which each pixel value is predicted for an encoding target block for each color component using the pixel values of reference pixels each configured as an encoded and reconstructed pixel. Also, as a prediction method for the luminance component, a total of 34 kinds of prediction methods are described in Non-patent document 1, including 32 directional prediction methods in addition to the DC prediction method and planar prediction method. Moreover, as a prediction method for the chrominance component, a method is described in Non-patent document 1 employing the same set of prediction methods as that used to predict the luminance component. Furthermore, another method is described in Non-patent document 1 employing a set of prediction methods that differs from that used to predict the luminance component, i.e., a set of the DC prediction method, planer prediction method, horizontal prediction method, and vertical prediction method. Such an arrangement is capable of reducing spatial redundancy for each color component.

Also, the LM mode is described in Non-patent document 2, which is configured as a method for reducing redundancy between the color components. For example, description will be made with reference to FIG. 13 regarding an arrangement in which the LM mode is applied to an image in the YUV420 format.

FIG. 13A shows the pixels of the chrominance component. FIG. 13B shows the pixels of the luminance component. In the LM mode, the chrominance component is calculated by linear prediction based on a prediction expression represented by the following Expression (1) using the reconstructed luminance components of the 16 pixels indicated by the open circles shown in FIG. 13B.

$$pred_c[x,y] = \alpha \times ((P_L[2x,2y] + P_L[2x,2y+1]) >> 1) + \beta \qquad \text{[Expression 1]}$$

In Expression (1), $P_L$ represents the pixel value of the luminance component, and $pred_c$ represents the predicted pixel value of the chrominance component. Also, α and β each represent a parameter that can be calculated using eight reference pixels indicated by solid circles shown in FIG. 13A and eight reference pixels indicated by solid circles shown in FIG. 13B. Specifically, the parameters α and β are represented by the following Expressions (2) and (3), respectively.

$$\alpha = \frac{R(\hat{P}_L, P'_C)}{R(\hat{P}_L, \hat{P}_L)}$$ [Expression 2]

$$\beta = M(P'_C) - a \times M(\hat{P}_L)$$ [Expression 3]

In Expressions (2) and (3), $P'_c$ represents the pixel value of the reference pixel of the chrominance component. Also, $P^\wedge_L$, represents the pixel value of the luminance component calculated giving consideration to the phase of the luminance component and the phase of the chrominance component. Specifically, $P^\wedge_L$, is represented by the following Expression (4).

$$\hat{P}_L[x,y]=(P_L[2x,2y]+P_L[2x,2y+1])>>1$$ [Expression 4]

It should be noted that, in order to reduce memory access, the calculation is performed for the reference pixels in an upper region without correcting the phase difference. Also, the chrominance prediction is performed for each smallest processing block, which is referred to as the "TU (Transform Unit)".

In a case in which the LM mode applied to an image in the YUV420 format as described above is extended such that it is applied to an image in the YUV422 format, the number of reference pixels is increased in the vertical direction as shown in FIG. 14.

FIG. 15 is a block diagram showing the intra prediction units 20 and 140 configured to perform the intra prediction using the aforementioned LM mode. The intra prediction units 20 and 140 each include a luminance reference pixel acquisition unit 21, a chrominance reference pixel acquisition unit 22, a prediction coefficient derivation unit 23, and a chrominance linear prediction unit 24.

The luminance reference pixel acquisition unit 21 receives the luminance component of the local decoded image f as its input data. The luminance reference pixel acquisition unit 21 acquires the pixel values of the reference pixels located neighboring a luminance block that corresponds to a color reference prediction target block, adjusts the phases of the reference pixel values, and outputs the pixel values thus adjusted as luminance reference pixel values h.

The chrominance reference pixel acquisition unit 22 receives the chrominance component of the local decoded image f as its input data. The chrominance reference pixel acquisition unit 22 acquires the pixel values of the reference pixels located neighboring the chrominance prediction target block, and outputs the pixel values thus acquired as chrominance reference pixel values i.

The prediction coefficient derivation unit 23 receives, as its input data, the luminance reference pixel values h and the chrominance reference pixel values i. The prediction coefficient derivation unit 23 calculates the parameters α and β based on the aforementioned Expressions (2) through (4) using the pixel values thus input so as to output a prediction coefficient j.

The chrominance linear prediction unit 24 receives, as its input data, the luminance component of the local decoded image f and the prediction coefficient j. The chrominance linear prediction unit 24 calculates a predicted pixel value of the color component based on the aforementioned Expression (1) using the signals thus input, and outputs the predicted pixel value as a chrominance predicted pixel value k.

The usable memory capacity has been increasing accompanying progress in semiconductor techniques. However, as the memory capacity is increased, memory access granularity becomes greater. On the other hand, there has been a relatively small improvement in memory bandwidth as compared with the improvement in memory capacity. A video is encoded and decoded using memory. Thus, memory access granularity and memory bandwidth become a bottleneck in an encoding/decoding operation for a video.

Also, memory (e.g., SRAM) that is closest to a calculation core requires high manufacturing costs and large power consumption as compared with external memory (e.g., DRAM). Thus, such memory that is closest to a calculation core is preferably configured to have as small a memory capacity as possible. However, even if a video is provided in a worst-case condition designed in the specification, such an arrangement is required to be capable of encoding and decoding the video. That is to say, the memory that is closest to a calculation core must satisfy a memory requirement (memory access granularity, size, number of memory units, etc.) in a worst-case condition, instead of a memory requirement in an average-case condition.

In the LM mode, as described above, parameter derivation is performed for each TU. This leads to an increased number of reference pixels, resulting in an increased number of times of calculation and an increased number of times of memory access.

Investigation will be made below regarding the number of times of calculation and the number of reference pixels required to perform the parameter derivation in a case in which the LM mode is applied to an image in the YUV420 format, for example. The block size of the LCU (Largest Coding Unit), which is the largest processing block, is defined as (64×64) or less in the main profile in Non-patent document 1. On the other hand, a smallest CU, which is a smallest processing block, has a block size of (4×4). Also, in the YUV420 format, the number of pixels of the chrominance component is ¼ that of the luminance component. Accordingly, a smallest calculation block for the luminance component has a block size of (8×8). Thus, the number of times of calculation required for the parameter derivation is represented by $(64 \div 8)^2=64$. The number of reference pixels is represented by (28×64).

In order to reduce the number of times of calculation in a worst-case condition required for the parameter derivation with respect to images in formats different from the YUV420 format, a method is described in Non-patent document 2 in which the parameter derivation is performed for each CU (Coding Unit). FIG. 16 shows the number of times of calculation and the number of reference pixels required for each of a case in which the parameter derivation is performed for each TU and a case in which the parameter deviation is performed for each CU.

RELATED ART DOCUMENTS

Non-Patent Documents

[Non-Patent Document 1]
JCTVC-L1003, High efficiency video coding (HEVC) text specification draft 10 (for FDIS & Consent)
[Non-Patent Document 2]
JCTVC-L0240, AHG7: "The performance of extended intra chroma prediction for non 4:2:0 format"

DISCLOSURE OF THE INVENTION

Problem to be Solved by the Invention

As can be understood from the investigation result for an image in the YUV444 format shown in FIG. 16, in a case in which the parameter derivation is performed for each LCU, such an arrangement requires a large number of reference pixels for the parameter derivation in a worst-case condition, which is a problem.

The present invention has been made in order to solve the aforementioned problem. Accordingly, it is a purpose of the present invention to provide a technique for reducing the number of reference pixels used to reduce the redundancy between color components.

Means to Solve the Problem

In order to solve the aforementioned problems, the present invention proposes the following items.

(1) The present invention proposes a video encoding apparatus (which corresponds to a video encoding apparatus AA shown in FIG. 1, for example) that encodes a video configured comprising multiple color components. The video encoding apparatus comprises an intra frame prediction unit (which corresponds to an intra frame prediction unit 20A shown in FIG. 1, for example) that performs intra frame prediction. The intra frame prediction unit comprises: a luminance reference pixel subsampling unit (which corresponds to a luminance reference pixel acquisition unit 21A shown in FIG. 2, for example) that subsamples reference pixels located neighboring a luminance block that corresponds to a chrominance prediction target block; a luminance reference pixel acquisition unit (which corresponds to a luminance reference pixel acquisition unit 21A shown in FIG. 2, for example) that acquires pixel values of the reference pixels after the subsampling by means of the luminance reference pixel subsampling unit; a chrominance reference pixel subsampling unit (which corresponds to a chrominance reference pixel acquisition unit 22A shown in FIG. 2, for example) that subsamples the reference pixels located neighboring the chrominance prediction target block; a chrominance reference pixel acquisition unit (which corresponds to a chrominance reference pixel acquisition unit 22A shown in FIG. 2, for example) that acquires pixel values of the reference pixels after the subsampling by means of the chrominance reference pixel subsampling unit; a prediction coefficient derivation unit (which corresponds to a prediction coefficient derivation unit 23 shown in FIG. 2, for example) that derives a prediction coefficient based on the pixel values acquired by the luminance reference pixel acquisition unit and the pixel values acquired by the chrominance reference pixel acquisition unit; and a chrominance linear prediction unit (which corresponds to a chrominance linear prediction unit 24 shown in FIG. 2, for example) that calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit.

With the invention, in the intra-frame prediction, the reference pixels located neighboring the luminance block that corresponds to the chrominance prediction target block are subsampled. Furthermore, the reference pixels located neighboring the chrominance prediction target block are subsampled. Thus, such an arrangement is capable of reducing the number of reference pixels which are used to reduce the redundancy between the color components.

(2) The present invention proposes the video encoding apparatus described in (1), wherein the luminance reference pixel subsampling unit and the chrominance reference pixel subsampling unit each perform the subsampling processing only when a smallest coding unit prepared beforehand is selected as a coding unit.

With the invention, in the video encoding apparatus described in (1), the aforementioned subsampling processing is performed only when the coding unit is set to a smallest coding unit prepared beforehand. Thus, such an arrangement is capable of reducing the number of reference pixels which are used to reduce the redundancy between the color components only when the coding unit is set to a smallest coding unit prepared beforehand.

(3) The present invention proposes the video encoding apparatus described in (1), wherein the luminance reference pixel subsampling unit and the chrominance reference pixel subsampling unit each perform the subsampling processing at all times regardless of a coding unit size.

With the invention, in the video encoding apparatus described in (1), the aforementioned subsampling processing is performed at all times regardless of the coding unit size. Thus, such an arrangement allows the number of reference pixels which are used to reduce the redundancy between the color components to be reduced at all times regardless of the coding unit size.

(4) The present invention proposes the video encoding apparatus described in any one of (1) through (3), wherein the luminance reference pixel subsampling unit performs subsampling so as to remove the reference pixels that are closer to an upper-left corner of the luminance block (see FIG. 8B, for example), and wherein the chrominance reference pixel subsampling unit performs subsampling so as to remove the reference pixels that are closer to an upper-left corner of the chrominance prediction target block (see FIG. 8A, for example).

With the invention, in any one of the video encoding apparatuses described in (1) through (3), subsampling is performed so as to remove the reference pixels that are close to the upper-left corner of the reference block and the reference pixels that are close to the upper-left corner of the chrominance prediction target block. As the reference pixels become closer to the upper-left corner, the reference pixels provides higher luminance intra prediction efficiency, which leads to a low contribution to the prediction coefficient. Thus, such an arrangement allows the number of reference pixels which are used to reduce the redundancy between the color components to be reduced at all times regardless of the luminance intra prediction efficiency and the coding unit size.

(5) The present invention proposes the video encoding apparatus described in any one of (1) through (4), wherein the luminance reference pixel subsampling unit subsamples the reference pixels located neighboring a luminance block that corresponds to the chrominance prediction target block such that the number of reference pixels is reduced to half of an original number of reference pixels, and wherein the chrominance reference pixel subsampling unit subsamples the reference pixels located neighboring the chrominance prediction target block such that the number of reference pixels is reduced to half of an original number of reference pixels.

With the invention, in any one of the video encoding apparatuses described in (1) through (4), the subsampling processing is performed such that the number of reference pixels is reduced to half the original number. Thus, the number of reference pixels used to reduce the redundancy between the color components can be reduced to half the original number.

(6) The present invention proposes a video decoding apparatus (which corresponds to a video decoding apparatus BB shown in FIG. 6, for example) that decodes a video configured comprising multiple color components. The video decoding apparatus comprising an intra frame prediction unit (which corresponds to an intra frame prediction unit 140A shown in FIG. 6, for example) that performs intra frame prediction. The intra frame prediction unit comprises: a luminance reference pixel subsampling unit (which corresponds to a luminance reference pixel acquisition unit 21A shown in FIG. 2, for example) that subsamples reference pixels located neighboring a luminance block that corresponds to a chrominance prediction target block; a luminance reference pixel acquisition unit (which corresponds to a luminance reference pixel acquisition unit 21A shown in FIG. 2, for example) that acquires pixel values of the reference pixels after the subsampling by means of the luminance reference pixel subsampling unit; a chrominance reference pixel subsampling unit (which corresponds to a chrominance reference pixel acquisition unit 22A shown in FIG. 2, for example) that subsamples the reference pixels located neighboring the chrominance prediction target block; a chrominance reference pixel acquisition unit (which corresponds to a chrominance reference pixel acquisition unit 22A shown in FIG. 2, for example) that acquires pixel values of the reference pixels after the subsampling by means of the chrominance reference pixel subsampling unit; a prediction coefficient derivation unit (which corresponds to a prediction coefficient derivation unit 23 shown in FIG. 2, for example) that derives a prediction coefficient based on the pixel values acquired by the luminance reference pixel acquisition unit and the pixel values acquired by the chrominance reference pixel acquisition unit; and a chrominance linear prediction unit (which corresponds to a chrominance linear prediction unit 24 shown in FIG. 2, for example) that calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit.

With the invention, in the intra-frame prediction, the reference pixels located neighboring the luminance block that corresponds to the chrominance prediction target block are subsampled. Furthermore, the reference pixels located neighboring the chrominance prediction target block are subsampled. Thus, such an arrangement is capable of reducing the number of reference pixels which are used to reduce the redundancy between the color components.

(7) The present invention proposes the video decoding apparatus described in (6), wherein the luminance reference pixel subsampling unit and the chrominance reference pixel subsampling unit each perform the subsampling processing only when a smallest coding unit prepared beforehand is selected as a coding unit.

With the invention, in the video decoding apparatus described in (6), the aforementioned subsampling processing is performed only when the coding unit is set to a smallest coding unit prepared beforehand. Thus, such an arrangement is capable of reducing the number of reference pixels which are used to reduce the redundancy between the color components only when the coding unit is set to a smallest coding unit prepared beforehand.

(8) The present invention proposes the video decoding apparatus described in (6), wherein the luminance reference pixel subsampling unit and the chrominance reference pixel subsampling unit each perform the subsampling processing at all times regardless of a coding unit size.

With the invention, in the video decoding apparatus described in (6), the aforementioned subsampling processing is performed at all times regardless of the coding unit size. Thus, such an arrangement allows the number of reference pixels which are used to reduce the redundancy between the color components to be reduced at all times regardless of the coding unit size.

(9) The present invention proposes the video decoding apparatus described in any one of (6) through (8), wherein the luminance reference pixel subsampling unit performs subsampling so as to remove the reference pixels that are closer to an upper-left corner of the luminance block (see FIG. 8B, for example), and wherein the chrominance reference pixel subsampling unit performs subsampling so as to remove the reference pixels that are closer to an upper-left corner of the chrominance prediction target block (see FIG. 8A, for example).

With the invention, in any one of the video decoding apparatuses described in (6) through (8), subsampling is performed so as to remove the reference pixels that are close to the upper-left corner of the reference block and the reference pixels that are close to the upper-left corner of the chrominance prediction target block. As the reference pixels become closer to the upper-left corner, the reference pixels provides higher luminance intra prediction efficiency, which leads to a low contribution to the prediction coefficient. Thus, such an arrangement allows the number of reference pixels which are used to reduce the redundancy between the color components to be reduced at all times regardless of the luminance intra prediction efficiency and the coding unit size.

(10) The present invention proposes the video decoding apparatus described in any one of (6) through (9), wherein the luminance reference pixel subsampling unit subsamples the reference pixels located neighboring a luminance block that corresponds to the chrominance prediction target block such that the number of reference pixels is reduced to half of an original number of reference pixels, and wherein the chrominance reference pixel subsampling unit subsamples the reference pixels located neighboring the chrominance prediction target block such that the number of reference pixels is reduced to half of an original number of reference pixels.

With the invention, in any one of the video decoding apparatuses described in (6) through (9), the subsampling processing is performed such that the number of reference pixels is reduced to half the original number. Thus, the number of reference pixels used to reduce the redundancy between the color components can be reduced to half the original number.

(11) The present invention proposes a video encoding method used by a video encoding apparatus (which corresponds to a video encoding apparatus AA shown in FIG. 1, for example) comprising an intra-frame prediction unit (which corresponds to an intra-frame prediction unit 20A shown in FIG. 1, for example), which comprises a luminance reference pixel subsampling unit (which corresponds to a luminance reference pixel acquisition unit 21A shown in FIG. 2, for example), a luminance reference pixel acquisition unit (which corresponds to a luminance reference pixel acquisition unit 21A shown in FIG. 2, for example), a chrominance reference pixel subsampling unit (which corresponds to a chrominance reference pixel acquisition unit 22A in FIG. 2, for example), a chrominance reference pixel acquisition unit (which corresponds to a chrominance reference pixel acquisition unit 22A in FIG. 2, for example), a prediction coefficient derivation unit (which corresponds to a prediction coefficient derivation unit 23 in FIG. 2, for example), and a chrominance linear prediction unit (which corresponds to a chrominance linear prediction unit 24 in FIG. 2, for example) and which is configured to encode a video comprising multiple color components. The video encoding method comprises: first processing in which the luminance reference pixel subsampling unit subsamples reference pixels located neighboring a luminance block that corresponds to a chrominance prediction target block; second processing in which the luminance reference pixel acquisition unit acquires pixel values of the reference pixels after the subsampling by means of the luminance reference pixel subsampling unit; third processing in which the chrominance reference pixel subsampling unit subsamples the reference pixels located neighboring the chrominance prediction target block; fourth processing in which the chrominance reference pixel acquisition unit acquires pixel values of the reference pixels after the subsampling by means of the chrominance reference pixel subsampling unit; fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit.

With the invention, in the intra-frame prediction, the reference pixels located neighboring the luminance block that corresponds to the chrominance prediction target block are subsampled. Furthermore, the reference pixels located neighboring the chrominance prediction target block are subsampled. Thus, such an arrangement is capable of reducing the number of reference pixels which are used to reduce the redundancy between the color components.

(12) The present invention proposes a video decoding method used by a video decoding apparatus (which corresponds to a video decoding apparatus BB shown in FIG. 6, for example) comprising an intra-frame prediction unit (which corresponds to an intra-frame prediction unit 20A shown in FIG. 1, for example), which comprises a luminance reference pixel subsampling unit (which corresponds to a luminance reference pixel acquisition unit 21A shown in FIG. 2, for example), a luminance reference pixel acquisition unit (which corresponds to a luminance reference pixel acquisition unit 21A shown in FIG. 2, for example), a chrominance reference pixel subsampling unit (which corresponds to a chrominance reference pixel acquisition unit 22A shown in FIG. 2, for example), a chrominance reference pixel acquisition unit (which corresponds to a chrominance reference pixel acquisition unit 22A shown in FIG. 2, for example), a prediction coefficient derivation unit (which corresponds to a prediction coefficient derivation unit 23 shown in FIG. 2, for example), and a chrominance linear prediction unit (which corresponds to a chrominance linear prediction unit 24 shown in FIG. 2, for example), and which is configured to decode a video comprising multiple color components. The video decoding method comprises: first processing in which the luminance reference pixel subsampling unit subsamples reference pixels located neighboring a luminance block that corresponds to a chrominance prediction target block; second processing in which the luminance reference pixel acquisition unit acquires pixel values of the reference pixels after the subsampling by means of the luminance reference pixel subsampling unit; third processing in which the chrominance reference pixel subsampling unit subsamples the reference pixels located neighboring the chrominance prediction target block; fourth processing in which the chrominance reference pixel acquisition unit acquires pixel values of the reference pixels after the subsampling by means of the chrominance reference pixel subsampling unit; fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit.

With the invention, in the intra-frame prediction, the reference pixels located neighboring the luminance block that corresponds to the chrominance prediction target block are subsampled. Furthermore, the reference pixels located neighboring the chrominance prediction target block are subsampled. Thus, such an arrangement is capable of reducing the number of reference pixels which are used to reduce the redundancy between the color components.

(13) The present invention proposes a computer program configured to instruct a computer to execute a video encoding method used by a video encoding apparatus (which corresponds to a video encoding apparatus AA shown in FIG. 1, for example) comprising an intra-frame prediction unit (which corresponds to an intra-frame prediction unit 20A shown in FIG. 1, for example), which comprises a luminance reference pixel subsampling unit (which corresponds to a luminance reference pixel acquisition unit 21A shown in FIG. 2, for example), a luminance reference pixel acquisition unit (which corresponds to a luminance reference pixel acquisition unit 21A shown in FIG. 2, for example), a chrominance reference pixel subsampling unit (which corresponds to a chrominance reference pixel acquisition unit 22A shown in FIG. 2, for example), a chrominance reference pixel acquisition unit (which corresponds to a chrominance reference pixel acquisition unit 22A shown in FIG. 2, for example), a prediction coefficient derivation unit (which corresponds to a prediction coefficient derivation unit 23 shown in FIG. 2, for example), and a chrominance linear prediction unit (which corresponds to a chrominance linear prediction unit 24 shown in FIG. 2, for example), and which is configured to encode a video comprising multiple color components. The video encoding method comprises: first processing in which the luminance reference pixel subsampling unit subsamples reference pixels located neighboring a luminance block that corresponds to a chrominance prediction target block; second processing in which the luminance reference pixel acquisition unit acquires pixel values of the reference pixels after the subsampling by means of the luminance reference pixel subsampling unit; third processing in which the chrominance reference pixel subsampling unit subsamples the reference pixels located neighboring the chrominance prediction target block; fourth processing in which the chrominance reference pixel acquisition unit acquires pixel values of the reference pixels after the subsampling by means of the chrominance reference pixel subsampling unit; fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit.

With the invention, in the intra-frame prediction, the reference pixels located neighboring the luminance block that corresponds to the chrominance prediction target block are subsampled. Furthermore, the reference pixels located neighboring the chrominance prediction target block are subsampled. Thus, such an arrangement is capable of reducing the number of reference pixels which are used to reduce the redundancy between the color components.

(14) The present invention proposes a computer program configured to instruct a computer to execute a video decoding method used by a video decoding apparatus (which corresponds to a video decoding apparatus BB shown in FIG. 6, for example) comprising an intra-frame prediction unit (which corresponds to an intra-frame prediction unit 20A shown in FIG. 1, for example), which comprises a luminance reference pixel subsampling unit (which corresponds to a luminance reference pixel acquisition unit 21A shown in FIG. 2, for example), a luminance reference pixel acquisition unit (which corresponds to a luminance reference pixel acquisition unit 21A shown in FIG. 2, for example), a chrominance reference pixel subsampling unit (which corresponds to a chrominance reference pixel acquisition unit 22A shown in FIG. 2, for example), a chrominance reference pixel acquisition unit (which corresponds to a chrominance reference pixel acquisition unit 22A shown in FIG. 2, for example), a prediction coefficient derivation unit (which corresponds to a prediction coefficient derivation unit 23 shown in FIG. 2, for example), and a chrominance linear prediction unit (which corresponds to a chrominance linear prediction unit 24 shown in FIG. 2, for example), and which is configured to decode a video comprising multiple color components. The video decoding method comprises: first processing in which the luminance reference pixel subsampling unit subsamples reference pixels located neighboring a luminance block that corresponds to a chrominance prediction target block; second processing in which the luminance reference pixel acquisition unit acquires pixel values of the reference pixels after the subsampling by means of the luminance reference pixel subsampling unit; third processing in which the chrominance reference pixel subsampling unit subsamples the reference pixels located neighboring the chrominance prediction target block; fourth processing in which the chrominance reference pixel acquisition unit acquires pixel values of the reference pixels after the subsampling by means of the chrominance reference pixel subsampling unit; fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit.

With the invention, in the intra-frame prediction, the reference pixels located neighboring the luminance block that corresponds to the chrominance prediction target block are subsampled. Furthermore, the reference pixels located neighboring the chrominance prediction target block are subsampled. Thus, such an arrangement is capable of reducing the number of reference pixels which are used to reduce the redundancy between the color components.

Advantage of the Present Invention

With the present invention, the number of reference pixels which are used to reduce the redundancy between the color components can be reduced to half the original number.

BRIEF DESCRIPTION OF THE DRAWINGS

FIGS. 3A and 3B are a diagram for describing the operation of the intra prediction unit included in the video encoding apparatus according to the embodiment.

FIG. 5 is a diagram for describing the operation of the intra prediction unit included in the video encoding apparatus according to the embodiment.

FIGS. 7A and 7B are a diagram for describing the operation of the intra prediction unit included in the video encoding apparatus according to a second embodiment of the present invention.

DRAWINGS

Figure 8B:
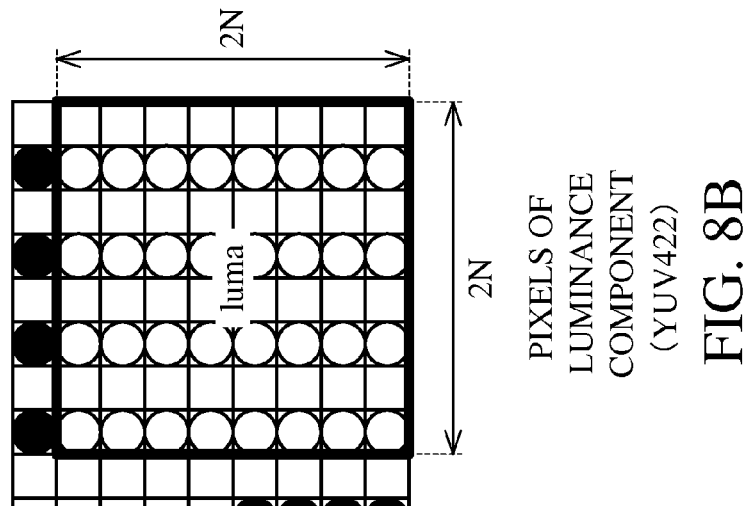
Figure 8A:
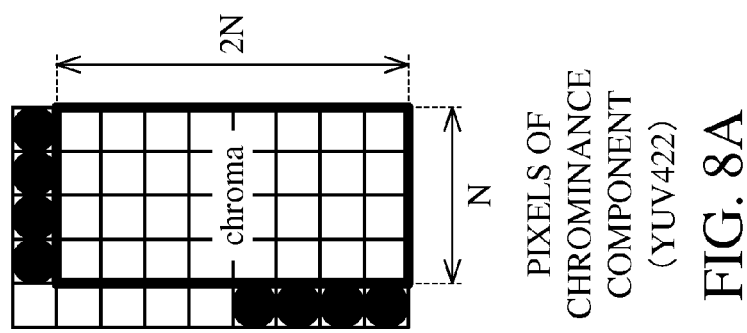

FIGS. 8A and 8B are a diagram for describing the operation of the intra prediction unit included in each of a video encoding apparatus and a video decoding apparatus according to a modification of the present invention.

FIGS. 9A and 9B are a diagram for describing the operation of the intra prediction unit included in each of a video encoding apparatus and a video decoding apparatus according to a modification of the present invention.

FIGS. 10A and 10B are a diagram for describing the operation of the intra prediction unit included in each of a video encoding apparatus and a video decoding apparatus according to a modification of the present invention.

Figure 11:
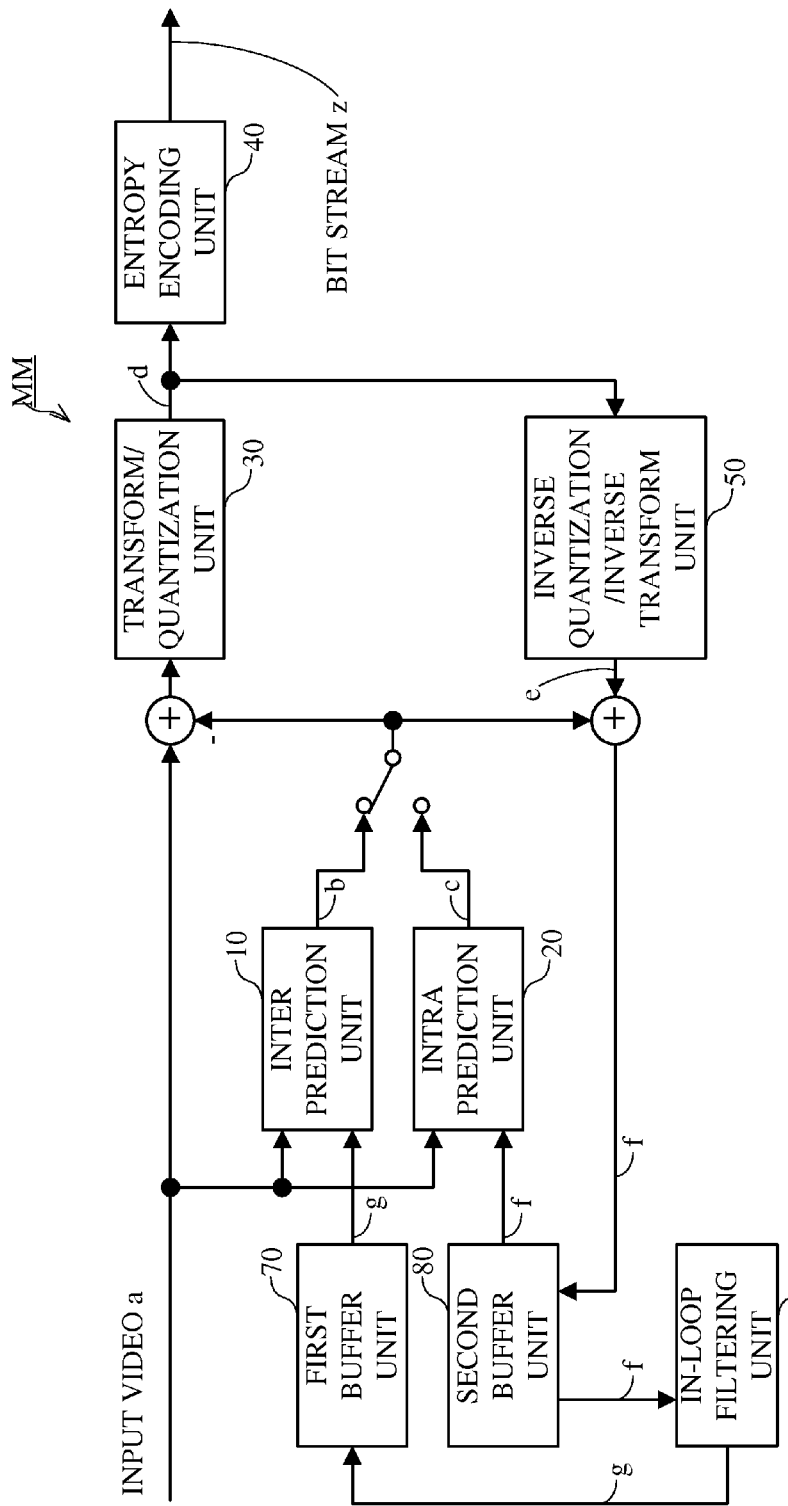

FIG. 11 is a block diagram showing a video encoding apparatus according to a conventional example.

Figure 12:
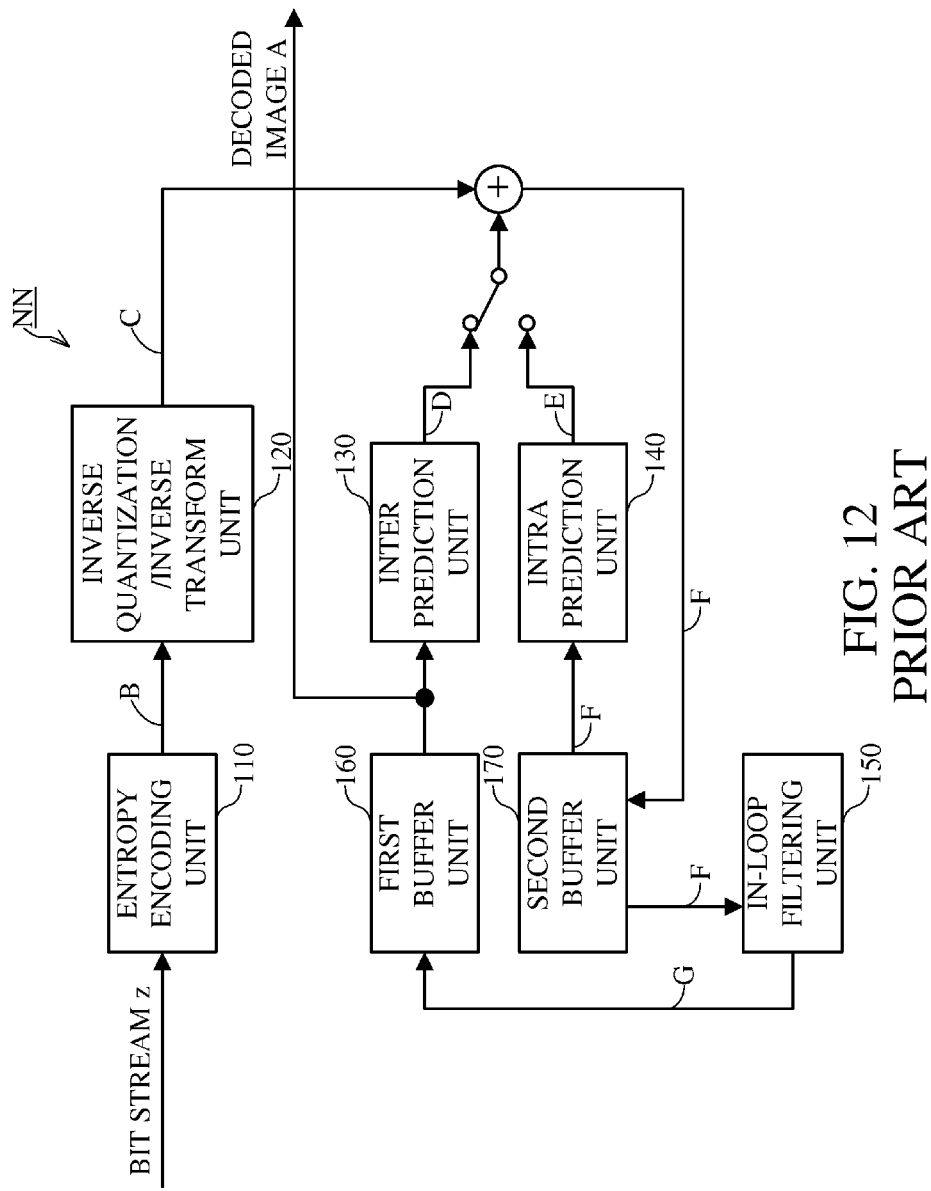

FIG. 12 is a block diagram showing a video decoding apparatus according to a conventional example.

Figure 13:
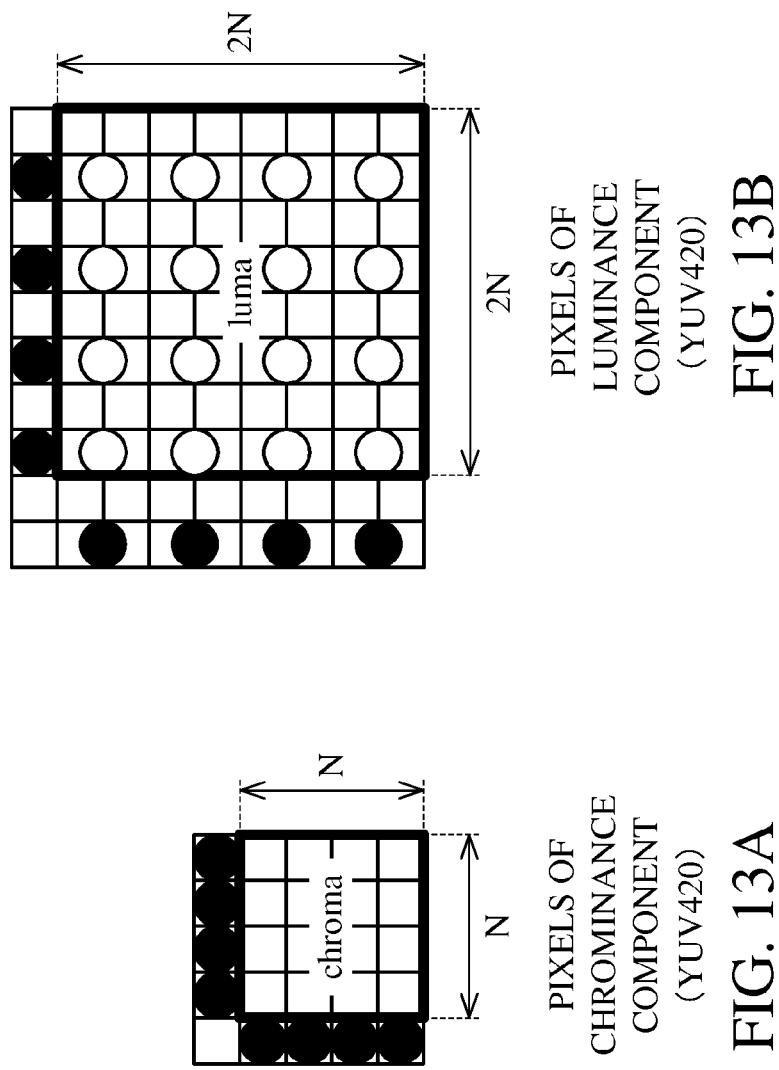

FIGS. 13A and 13B are a diagram for describing the operation of an intra prediction unit included in each of a video encoding apparatus and a video decoding apparatus according to a conventional example.

Figure 14:
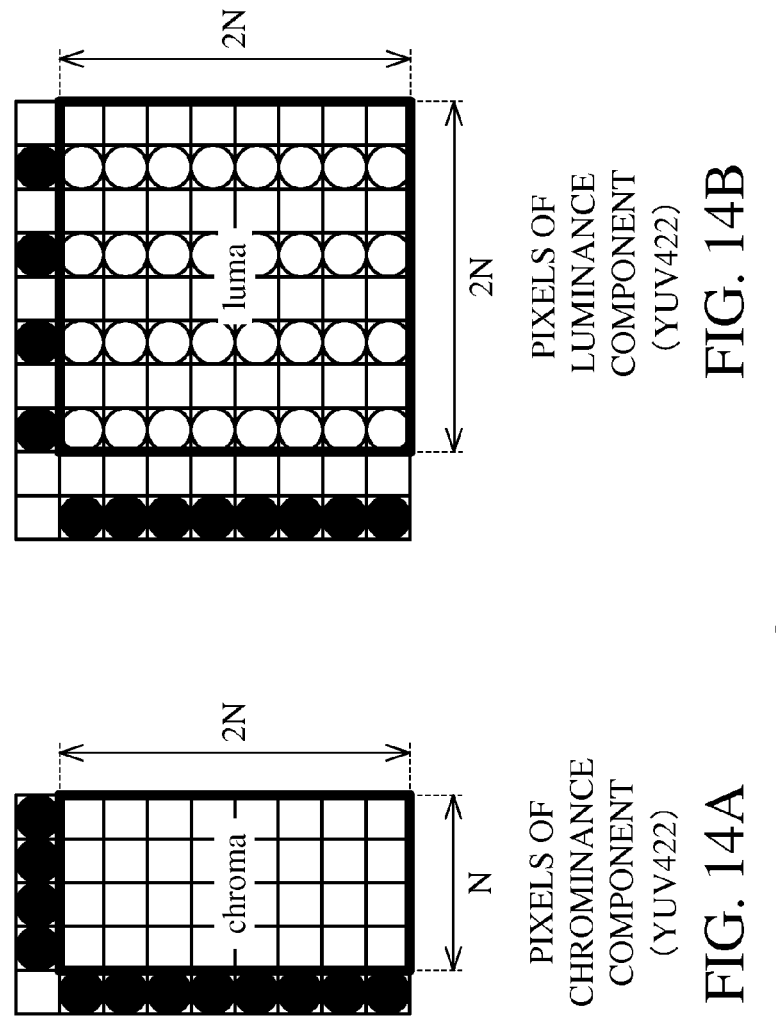

FIGS. 14A and 14B are a diagram for describing the operation of an intra prediction unit included in each of a video encoding apparatus and a video decoding apparatus according to a conventional example.

Figure 15:
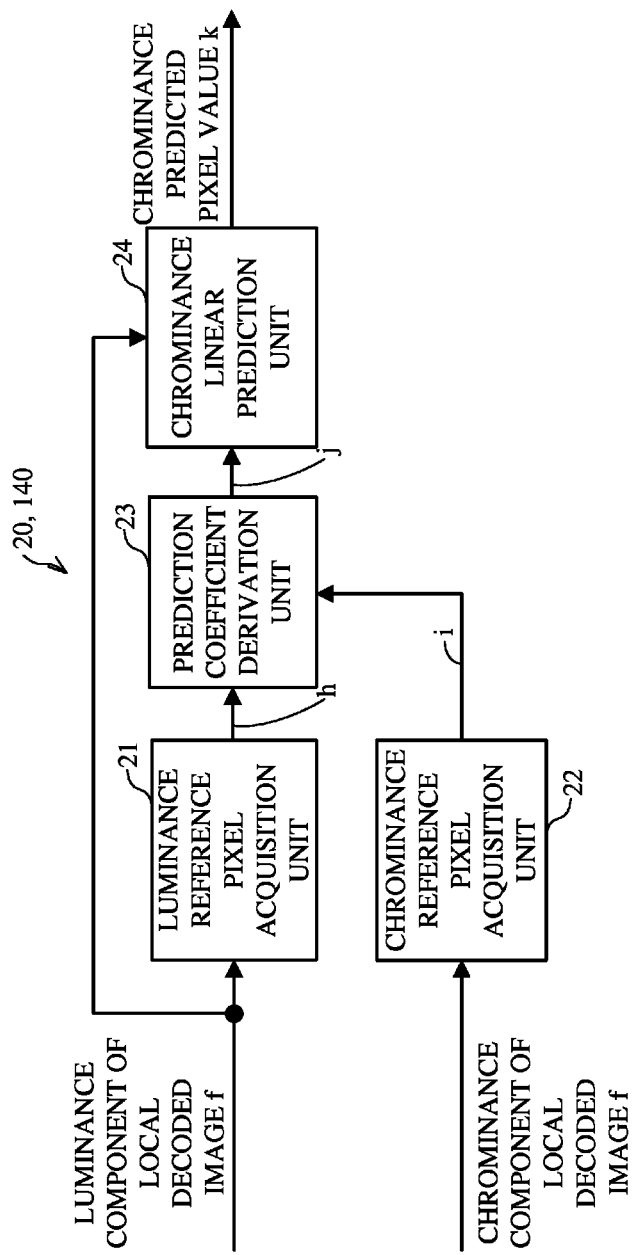

FIG. 15 is a block diagram showing an intra prediction unit included in each of a video encoding apparatus and a video decoding apparatus according to a conventional example.

FIG. 16 is a diagram for describing the operation of an intra prediction unit included in each of a video encoding apparatus and a video decoding apparatus according to a conventional example.

BEST MODE FOR CARRYING OUT THE INVENTION

Description will be made below regarding embodiments of the present invention with reference to the drawings. It should be noted that each of the components of the following embodiments can be replaced by a different known component or the like as appropriate. Also, any kind of variation may be made including a combination with other known components. That is to say, the following embodiments described below do not intend to limit the content of the present invention described in the appended claims.

First Embodiment

[Configuration and Operation of Video Encoding Apparatus AA]

Figure 1:
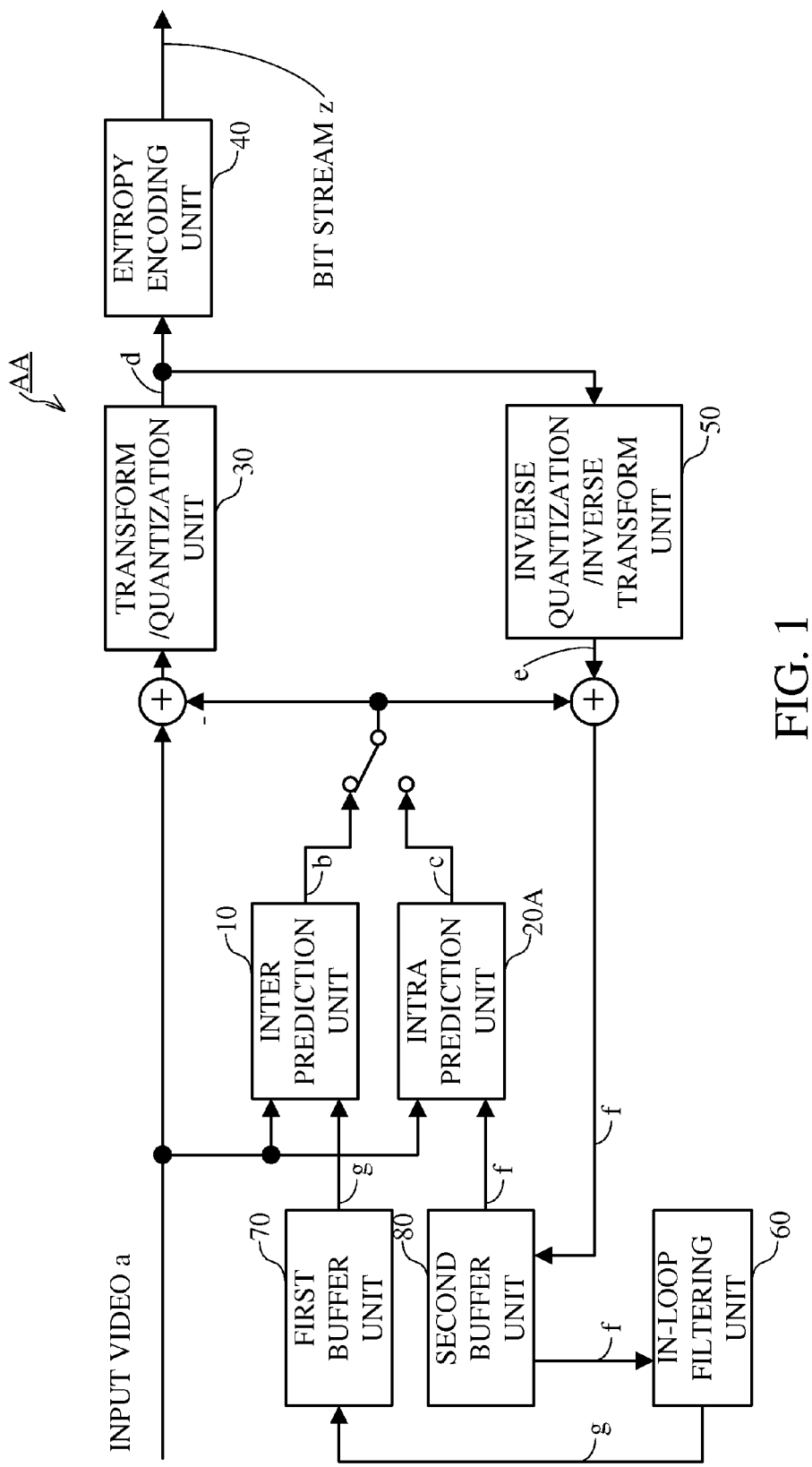
FIG. 1 is a block diagram showing a video encoding apparatus according to a first embodiment of the present invention.

FIG. 1 is a block diagram showing a video encoding apparatus AA according to a first embodiment of the present invention. The video encoding apparatus AA has the same configuration as that of the video encoding apparatus MM according to a conventional example shown in FIG. 11 except that the video encoding apparatus AA includes an intra prediction unit 20A instead of the intra prediction unit 20. It should be noted that, in the description of the video encoding apparatus AA, the same components as those of the video encoding apparatus MM are indicated by the same reference symbols, and description thereof will be omitted.

Figure 2:
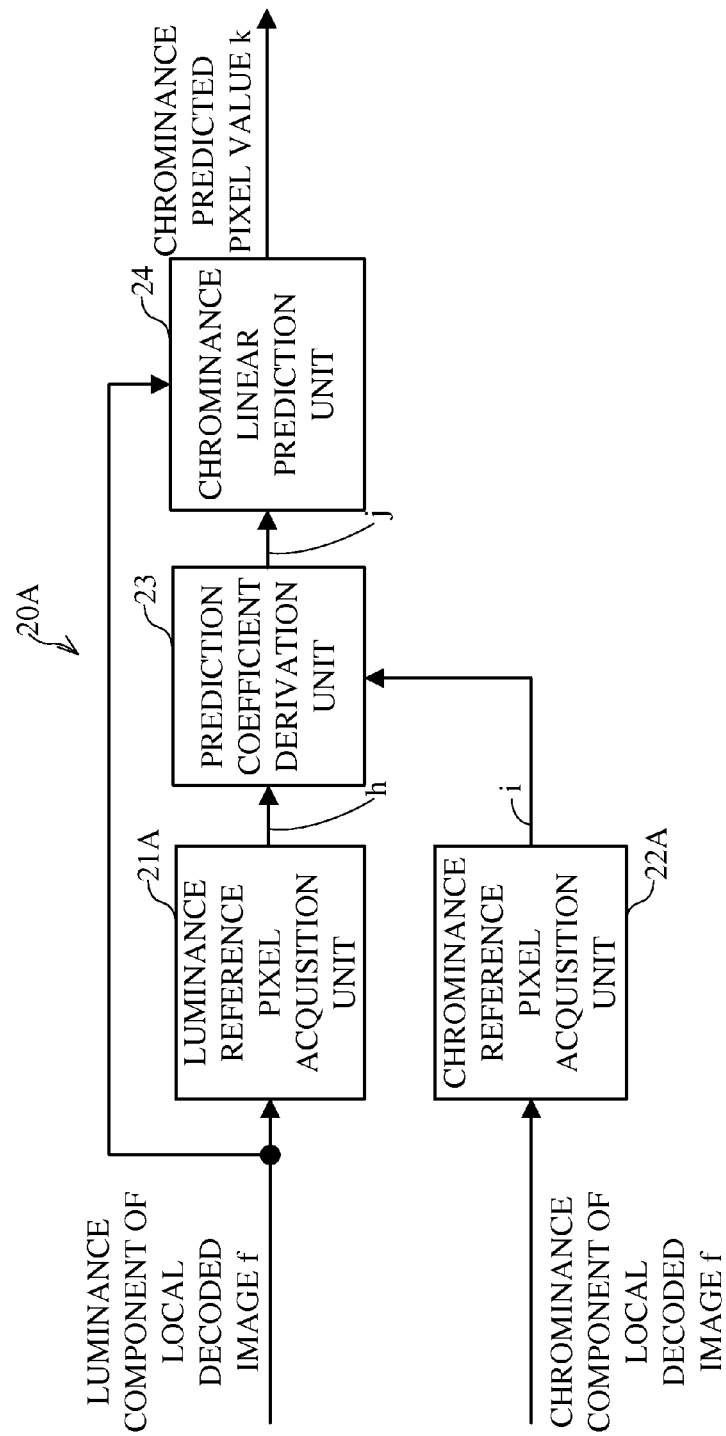
FIG. 2 is a block diagram showing an intra prediction unit included in the video encoding apparatus according to the embodiment.

FIG. 2 is a block diagram showing the intra prediction unit 20A. The intra prediction unit 20A has the same configuration as that of the intra prediction unit 20 according to a conventional example shown in FIG. 15 except that the intra prediction unit 20A includes a luminance reference pixel acquisition unit 21A instead of the luminance reference pixel acquisition unit 21, and includes a chrominance reference pixel acquisition unit 22A instead of the chrominance reference pixel acquisition unit 22.

The luminance reference pixel acquisition unit 21A receives the luminance component of the local decoded image f as its input data. The luminance reference pixel acquisition unit 21A acquires the pixel values of the reference pixels located neighboring a luminance block that corresponds to a chrominance prediction target block, adjusts the phase of each pixel thus acquired, and outputs the pixel values thus subjected to phase adjustment as luminance reference pixel values h. Furthermore, in a case in which reference pixel values are acquired for a smallest CU block which is a smallest coding unit (CU), the reference pixels arranged at integer pixel positions around the luminance block that corresponds to the chrominance prediction target block are subsampled, the pixel values of the reference pixels are acquired after the subsampling, and the pixel values thus acquired are output as the luminance reference pixel values h.

The chrominance reference pixel acquisition unit 22A receives the chrominance component of the local decoded image f as its input data. The chrominance reference pixel acquisition unit 22A acquires the pixel values of the reference pixels located neighboring a chrominance prediction target block, and outputs the pixel values thus acquired as chrominance reference pixel values i. Furthermore, in a case in which the chrominance reference pixel acquisition unit 22A acquires the reference pixel values for a smallest CU block which is a smallest coding unit (CU), the reference pixels arranged at integer pixel positions around the chrominance prediction target block are subsampled, the pixel values of the reference pixels are acquired after the subsampling, and the pixel values thus acquired are output as the chrominance reference pixel values i.

Description will be made with reference to FIG. 3 regarding the operation of the intra prediction unit 20A in a case in which the input video a is configured as an image in the YUV422 format. Also, description will be made with reference to FIG. 4 regarding the operation of the intra prediction unit 20A in a case in which the input video a is configured as an image in the YUV444 format. FIG. 5 shows the number of times of calculation and the number of reference pixels required for each of a case in which the parameters are derived by means of the intra prediction unit 20A and a case in which the parameters are derived for each CU according to a conventional example.

FIG. 3A shows the pixels of the chrominance component, and FIG. 3B shows the pixels of the luminance component. As shown in FIG. 3B, the luminance reference pixel acquisition unit 21A performs subsampling processing such that the number of reference pixels along a long side of the luminance block that corresponds to the encoding target block is reduced from 8 to 4, which is half the original number. Furthermore, as shown in FIG. 3A, the chrominance reference pixel acquisition unit 22A performs subsampling processing such that the number of reference pixels along a long side of the encoding target block is reduced from 8 to 4, which is half the original number.

Figure 4B:
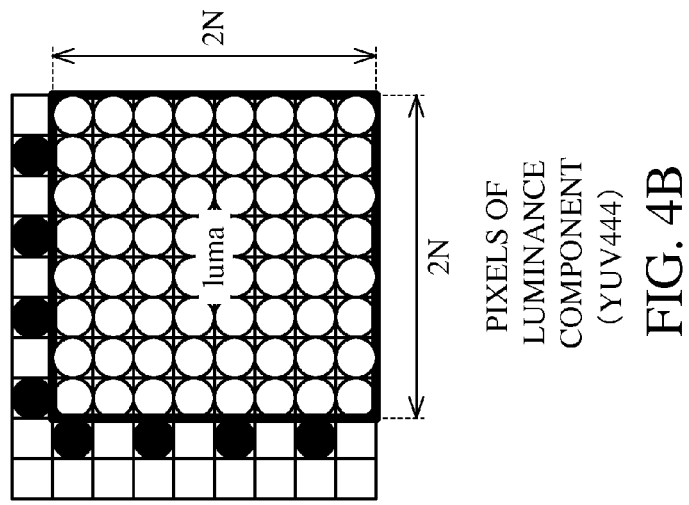
FIGS. 4A and 4B are a diagram for describing the operation of the intra prediction unit included in the video encoding apparatus according to the embodiment.
Figure 4A:
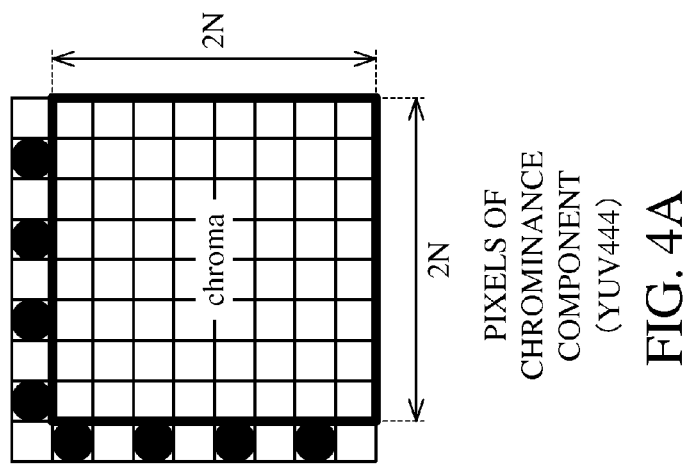

Also, FIG. 4A shows the pixels of the chrominance component, and FIG. 4B shows the pixels of the luminance component. As shown in FIG. 4B, the luminance reference pixel acquisition unit 21A performs subsampling processing such that the number of reference pixels along a long side of the luminance block that corresponds to the encoding target block is reduced from 16 to 8, which is half the original number. Furthermore, as shown in FIG. 4A, the chrominance reference pixel acquisition unit 22A performs subsampling processing such that the number of reference pixels along a long side of the encoding target block is reduced from 16 to 8, which is half the original number.

[Configuration and Operation of Video Decoding Apparatus BB]

Figure 6:
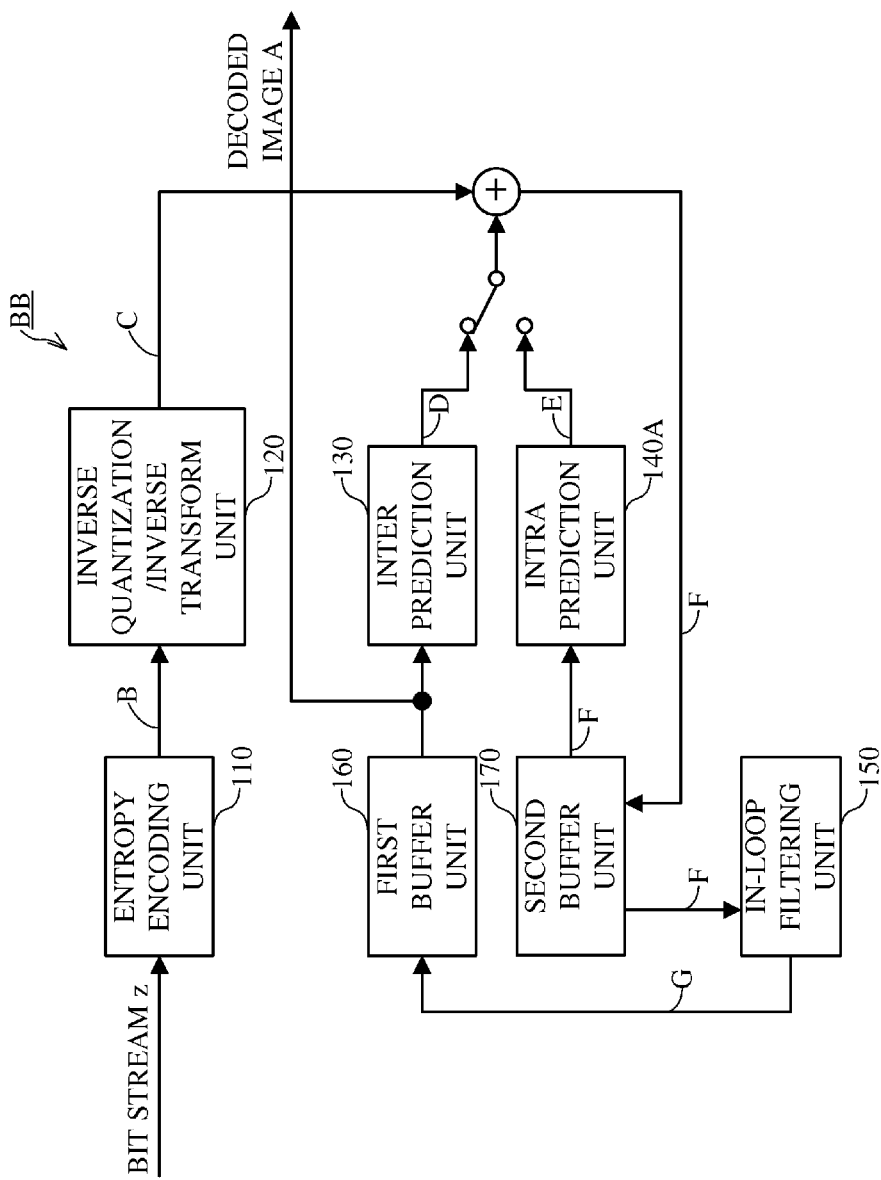
FIG. 6 is a block diagram showing a video decoding apparatus according to the first embodiment of the present invention.

FIG. 6 is a block diagram showing a video decoding apparatus BB according to a first embodiment of the present invention. The video decoding apparatus BB has the same configuration as that of the video decoding apparatus NN according to a conventional example shown in FIG. 12 except that the video decoding apparatus BB includes an intra prediction unit 140A instead of the intra prediction unit 140. It should be noted that, in the description of the video decoding apparatus BB, the same components as those of the video decoding apparatus NN are indicated by the same reference symbols, and description thereof will be omitted.

The intra prediction unit 140A includes a luminance reference pixel acquisition unit 21A, a chrominance reference pixel acquisition unit 22A, a prediction coefficient derivation unit 23, and a chrominance linear prediction unit 24 shown in FIG. 2, as with the intra prediction unit 20A.

With the video encoding apparatus AA and the video decoding apparatus BB, the following advantages can be provided.

With the video encoding apparatus AA and the video decoding apparatus BB, in a case in which the luminance reference pixel acquisition unit 21A acquires the reference pixels for a smallest CU block which is a smallest coding unit (CU), the reference pixels arranged at integer pixel positions around a luminance block that corresponds to a chrominance prediction target block are subsampled, and the pixel values of the reference pixels are acquired after the subsampling. Also, in a case in which the chrominance reference pixel acquisition unit 22A acquires the reference pixels for a smallest CU block which is a smallest coding unit (CU), the reference pixels arranged at integer pixel positions around the chrominance prediction target block are subsampled, and the pixel values of the reference pixels are acquired after the subsampling. Such an arrangement is capable of reducing the number of reference pixels, which are used to reduce the redundancy between the color components, to half the original number.

Second Embodiment

[Configuration and Operation of Video Encoding Apparatus CC]

Description will be made below regarding a video encoding apparatus CC according to a second modification of the present invention. The video encoding apparatus CC has the same configuration as that of the video encoding apparatus AA according to the first embodiment of the present invention shown in FIG. 1 except that the video encoding apparatus CC includes an intra prediction unit 20B instead of the intra prediction unit 20A. It should be noted that, in the description of the video encoding apparatus CC, the same components as those of the video encoding apparatus AA are indicated by the same reference symbols, and description thereof will be omitted.

The intra prediction unit 20B has the same configuration as that of the intra prediction unit 20A according to the first embodiment of the present invention shown in FIG. 1 except that the intra prediction unit 20B includes a luminance reference pixel acquisition unit 21B instead of the luminance reference pixel acquisition unit 21A, and includes a chrominance reference pixel acquisition unit 22B instead of the chrominance reference pixel acquisition unit 22A.

The luminance reference pixel acquisition unit 21B receives the luminance component of the local decoded image f as its input data. The luminance reference pixel acquisition unit 21B acquires the pixel values of the reference pixels located neighboring a luminance block that corresponds to a chrominance prediction target block, adjusts the phase of each pixel thus acquired, and outputs the pixel values thus subjected to phase adjustment as luminance reference pixel values h. Furthermore, in a case in which reference pixel values are acquired for a smallest CU block which is a smallest coding unit (CU), the luminance reference pixel acquisition unit 21B performs subsampling processing on the reference pixels arranged at integer pixel positions around the luminance block that corresponds to the chrominance prediction target block such that the number of reference pixels is reduced to half of the original number, acquires the pixel values of the reference pixels after the subsampling, and outputs the pixel values thus acquired as the luminance reference pixel values h.

The chrominance reference pixel acquisition unit 22B receives the chrominance component of the local decoded image f as its input data. The chrominance reference pixel acquisition unit 22B acquires the pixel values of the reference pixels located neighboring a chrominance prediction target block, and outputs the pixel values thus acquired as chrominance reference pixel values i. Furthermore, in a case in which the chrominance reference pixel acquisition unit 22B acquires the reference pixel values for a smallest CU block which is a smallest coding unit (CU), the chrominance reference pixel acquisition unit 22B performs subsampling processing on the reference pixels arranged at integer pixel positions around the chrominance prediction target block such that the number of reference pixels is reduced to half of the original number, acquires the pixel values of the reference pixels after the subsampling, and outputs the pixel values thus acquired as the chrominance reference pixel values i.

Description will be made with reference to FIG. 7 regarding the operation of the intra prediction unit 20B in a case in which the input video a is configured as an image in the YUV420 format.

FIG. 7A shows the pixels of the chrominance component, and FIG. 7B shows the pixels of the luminance component. As shown in FIG. 7B, the luminance reference pixel acquisition unit 21B performs subsampling processing such that the number of reference pixels along a long side of the luminance block that corresponds to the encoding target block is reduced from 8 to 4, which is half the original number. Furthermore, as shown in FIG. 7A, the chrominance reference pixel acquisition unit 22B performs subsampling processing such that the number of reference pixels along a long side of the encoding target block is reduced from 8 to 4, which is half the original number.

[Configuration and Operation of Video Decoding Apparatus DD]

Description will be made below regarding a video decoding apparatus DD according to a second embodiment of the present invention. The video decoding apparatus DD has the same configuration as that of the video decoding apparatus BB according to the first embodiment of the present invention shown in FIG. 6 except that the video decoding apparatus DD includes an intra prediction unit 140B instead of the intra prediction unit 140A. It should be noted that, in the description of the video decoding apparatus DD, the same components as those of the video decoding apparatus BB are indicated by the same reference symbols, and description thereof will be omitted.

The intra prediction unit 140B includes a luminance reference pixel acquisition unit 21B, a chrominance reference pixel acquisition unit 22B, a prediction coefficient derivation unit 23, and a chrominance linear prediction unit 24, as with the intra prediction unit 20B.

With the video encoding apparatus CC and the video decoding apparatus DD, the following advantages can be provided.

With the video encoding apparatus CC and the video decoding apparatus DD, in a case in which the luminance reference pixel acquisition unit 21B acquires the reference pixels for a smallest CU block which is a smallest coding unit (CU), the reference pixels arranged at integer pixel positions around a luminance block that corresponds to a chrominance prediction target block are subsampled, and the pixel values of the reference pixels are acquired after the subsampling. Also, in a case in which the chrominance reference pixel acquisition unit 22B acquires the reference pixels for a smallest CU block which is a smallest coding unit (CU), the reference pixels arranged at integer pixel positions around the chrominance prediction target block are subsampled, and the pixel values of the reference pixels are acquired after the subsampling. Such an arrangement is capable of reducing the number of reference pixels, which are used to reduce the redundancy between the color components, to half the original number.

Third Embodiment

[Configuration and Operation of Video Encoding Apparatus EE]

Description will be made below regarding a video encoding apparatus EE according to a third modification of the present invention. The video encoding apparatus EE has the same configuration as that of the video encoding apparatus AA according to the first embodiment of the present invention shown in FIG. 1 except that the video encoding apparatus EE includes an intra prediction unit 20C instead of the intra prediction unit 20A. It should be noted that, in the description of the video encoding apparatus EE, the same components as those of the video encoding apparatus AA are indicated by the same reference symbols, and description thereof will be omitted.

The intra prediction unit 20C has the same configuration as that of the intra prediction unit 20A according to the first embodiment of the present invention shown in FIG. 1 except that the intra prediction unit 20C includes a luminance reference pixel acquisition unit 21C instead of the luminance reference pixel acquisition unit 21A, and includes a chrominance reference pixel acquisition unit 22C instead of the chrominance reference pixel acquisition unit 22A.

The luminance reference pixel acquisition unit 21C receives the luminance component of the local decoded image f as its input data. The luminance reference pixel acquisition unit 21C subsamples the reference pixels arranged at integer pixel positions around a luminance block that corresponds to a chrominance prediction target block so as to reduce the number of reference pixels to half the original number at all times regardless of the coding unit size, acquires the pixel values of the reference pixels after the subsampling, and outputs the pixel values thus acquired as the luminance reference pixel values h.

The chrominance reference pixel acquisition unit 22C receives the chrominance component of the local decoded image f as its input data. The chrominance reference pixel acquisition unit 22C subsamples the reference pixels arranged at integer pixel positions around the chrominance prediction target block so as to reduce the number of reference pixels to half the original number at all times regardless of the coding unit size, acquires the pixel values of the reference pixels after the subsampling, and outputs the pixel values thus acquired as the chrominance reference pixel values i.

[Configuration and Operation of Video Decoding Apparatus FF]

Description will be made below regarding a video decoding apparatus FF according to a third embodiment of the present invention. The video decoding apparatus FF has the same configuration as that of the video decoding apparatus BB according to the first embodiment of the present invention shown in FIG. 6 except that the video decoding apparatus FF includes an intra prediction unit 140C instead of the intra prediction unit 140A. It should be noted that, in the description of the video decoding apparatus FF, the same components as those of the video decoding apparatus BB are indicated by the same reference symbols, and description thereof will be omitted.

The intra prediction unit 140C includes a luminance reference pixel acquisition unit 21C, a chrominance reference pixel acquisition unit 22C, a prediction coefficient derivation unit 23, and a chrominance linear prediction unit 24, as with the intra prediction unit 20C.

With the video encoding apparatus EE and the video decoding apparatus FF, the following advantages can be provided.

With the video encoding apparatus EE and the video decoding apparatus FF, the luminance reference pixel acquisition unit 21C subsamples the reference pixels arranged at integer pixel positions around a luminance block that corresponds to a chrominance prediction target block so as to reduce the number of reference pixels to half the original number at all times regardless of the coding unit size, and acquires the pixel values of the reference pixels after the subsampling. Furthermore, the chrominance reference pixel acquisition unit 22C subsamples the reference pixels arranged at integer pixel positions around the chrominance prediction target block so as to reduce the number of reference pixels to half the original number at all times regardless of the coding unit size, and acquires the pixel values of the reference pixels after the subsampling. Such an arrangement is capable of reducing the number of reference pixels, which are used to reduce the redundancy between the color components, to half the original number.

It should be noted that the operation of the video encoding apparatus AA, CC, or EE, or the operation of the video decoding apparatus BB, DD, or FF may be recorded on a computer-readable non-temporary recording medium, and the video encoding apparatus AA, CC, or EE or the video decoding apparatus BB, DD, or FF may read out and execute the programs recorded on the recording medium, which provides the present invention.

Here, examples of the aforementioned recording medium include nonvolatile memory such as EPROM, flash memory, and the like, a magnetic disk such as a hard disk, and CD-ROM and the like. Also, the programs recorded on the recording medium may be read out and executed by a processor provided to the video encoding apparatus AA, CC, or EE or a processor provided to the video decoding apparatus BB, DD, or FF.

Also, the aforementioned program may be transmitted from the video encoding apparatus AA, CC, or EE or the video decoding apparatus BB, DD, or FF, which stores the program in a storage device or the like, to another computer system via a transmission medium or transmission wave used in a transmission medium. The term "transmission medium" as used here represents a medium having a function of transmitting information, examples of which include a network (communication network) such as the Internet, etc., and a communication link (communication line) such as a phone line, etc.

Also, the aforementioned program may be configured to provide a part of the aforementioned functions. Also, the aforementioned program may be configured to provide the aforementioned functions in combination with a different program already stored in the video encoding apparatus AA, CC, or EE or the video decoding apparatus BB, DD, or FF. That is to say, the aforementioned program may be configured as a so-called differential file (differential program).

Detailed description has been made above regarding the embodiments of the present invention with reference to the drawings. However, the specific configuration thereof is not restricted to the above-described embodiments. Rather, various kinds of design change may be made without departing from the spirit of the present invention.

For example, description has been made with reference to FIG. 3 regarding an arrangement in which subsampling is performed such that every second pixel is removed among the reference pixels located along a long side of a luminance block that corresponds to an encoding target block and for the reference pixels located along a long side of the encoding target block. However the present invention is not restricted to such an arrangement. For example, as shown in FIG. 8, subsampling may be performed such that the uppermost reference pixel and the subsequent three pixels are removed. Also, as shown in FIG. 9, an arrangement may be made in which subsampling is performed so as to remove the uppermost reference pixel and the subsequent three pixels among the reference pixels located along a long side of a luminance block that corresponds to an encoding target block and among the reference pixels located along a long side of the encoding target block in the same way as shown in FIG. 8, and subsampling is performed so as to remove the leftmost reference pixel and the subsequent one reference pixel among the reference pixels located along a short side of the luminance block that corresponds to the encoding target block and among the reference pixels located along a short side of the encoding target block.

Also, description has been made with reference to FIG. 4 regarding an arrangement in which subsampling is performed such that every second pixel is removed among the reference pixels located along a long side and a short side of a luminance block that corresponds to an encoding target block and for the reference pixels located along a long side and a short side of the encoding target block. However, the present invention is not restricted to such an arrangement. Also, as shown in FIG. 10, an arrangement may be made in which subsampling is performed such that the uppermost reference pixel and the subsequent three reference pixels are removed among the reference pixels located along the long side of the luminance block that corresponds to the encoding target block and for the reference pixels located along the long side of the encoding target block, and such that the leftmost reference pixel and the subsequent three reference pixels are removed among the reference pixels located along the short side of the luminance block that corresponds to the encoding target block and for the reference pixels located along the short side of the encoding target block.

With such an arrangement, as the reference pixels become closer to the upper-left corner, the reference pixels provide higher luminance intra prediction efficiency, which leads to a low contribution to the prediction coefficient. Thus, as shown in FIGS. 8 through 10, subsampling may be performed such that the reference pixels that are closer to the upper-left corner are removed for each of the encoding target block and the luminance block that corresponds to the encoding target block. That is to say, the reference pixels that are far from the upper-left corner are used to derive the prediction coefficient j. Such an arrangement is capable of reducing the number of reference pixels, which are used to reduce the redundancy between the color components, to half the original number at all times regardless of the luminance intra prediction efficiency and the coding unit size.

It should be noted that, in a case of employing the video encoding apparatus and the video decoding apparatus according to any one of the aforementioned embodiments, it has been confirmed that the tradeoff efficiency reduction is only on the order of 0.04% to 0.06% under the common experimental conditions proposed by the standardization association, as compared with the techniques described in Non-patent document 2. Thus, such an arrangement is capable of reducing the number of reference pixels, which are used to reduce the redundancy between the color components, to half the original number while suppressing the efficiency reduction to a negligible level.

DESCRIPTION OF THE REFERENCE NUMERALS

AA, CC, EE, MM video encoding apparatus, BB, DD, FF, NN video decoding apparatus, 20, 20A through 20C, 140, 140A through 140C intra prediction unit, 21, 21A through 21C luminance reference pixel acquisition unit, 22, 22A through 22C chrominance reference pixel acquisition unit, 23 prediction coefficient derivation unit, 24 chrominance linear prediction unit.

The invention claimed is:
1. A video encoding apparatus that encodes a video configured comprising a plurality of color components, the video encoding apparatus comprising an intra frame prediction unit that performs intra frame prediction, wherein the intra frame prediction unit comprises:
a luminance reference pixel subsampling unit that, in subsamples reference pixels located neighboring a luminance block that corresponds to a chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the luminance block consecutively from the left;
a luminance reference pixel acquisition unit that acquires pixel values of the reference pixels after the subsampling by means of the luminance reference pixel subsampling unit;
a chrominance reference pixel subsampling unit that, in subsamples the reference pixels located neighboring the chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the chrominance prediction target block consecutively from the left;

a chrominance reference pixel acquisition unit that acquires pixel values of the reference pixels after the subsampling by means of the chrominance reference pixel subsampling unit;

a prediction coefficient derivation unit that derives a prediction coefficient based on the pixel values acquired by the luminance reference pixel acquisition unit and the pixel values acquired by the chrominance reference pixel acquisition unit; and a chrominance linear prediction unit that calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit, wherein the luminance reference pixel subsampling unit and the chrominance reference pixel subsampling unit each perform the subsampling processing only when a smallest coding unit prepared beforehand is selected as a coding unit.

2. The video encoding apparatus according to claim 1, wherein the luminance reference pixel subsampling unit and the chrominance reference pixel subsampling unit each perform the subsampling processing at all times regardless of a coding unit size.

3. The video encoding apparatus according to claim 1, wherein the luminance reference pixel subsampling unit subsamples the reference pixels located neighboring a luminance block that corresponds to the chrominance prediction target block such that the number of reference pixels is reduced to half of an original number of reference pixels, and wherein the chrominance reference pixel subsampling unit subsamples the reference pixels located neighboring the chrominance prediction target block such that the number of reference pixels is reduced to half of an original number of reference pixels.

4. A video decoding apparatus that decodes a video configured comprising a plurality of color components, the video decoding apparatus comprising an intra frame prediction unit that performs intra frame prediction, wherein the intra frame prediction unit comprises:

a luminance reference pixel subsampling unit that, in subsamples reference pixels located neighboring a luminance block that corresponds to a chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the luminance block consecutively from the left;

a luminance reference pixel acquisition unit that acquires pixel values of the reference pixels after the subsampling by means of the luminance reference pixel subsampling unit;

a chrominance reference pixel subsampling unit that, in subsamples the reference pixels located neighboring the chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the chrominance prediction target block consecutively from the left;

a chrominance reference pixel acquisition unit that acquires pixel values of the reference pixels after the subsampling by means of the chrominance reference pixel subsampling unit;

a prediction coefficient derivation unit that derives a prediction coefficient based on the pixel values acquired by the luminance reference pixel acquisition unit and the pixel values acquired by the chrominance reference pixel acquisition unit; and a chrominance linear prediction unit that calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit, wherein the luminance reference pixel subsampling unit and the chrominance reference pixel subsampling unit each perform the subsampling processing only when a smallest coding unit prepared beforehand is selected as a coding unit.

5. The video decoding apparatus according to claim 4, wherein the luminance reference pixel subsampling unit and the chrominance reference pixel subsampling unit each perform the subsampling processing at all times regardless of a coding unit size.

6. The video decoding apparatus according to claim 4, wherein the luminance reference pixel subsampling unit subsamples the reference pixels located neighboring a luminance block that corresponds to the chrominance prediction target block such that the number of reference pixels is reduced to half of an original number of reference pixels, and wherein the chrominance reference pixel subsampling unit subsamples the reference pixels located neighboring the chrominance prediction target block such that the number of reference pixels is reduced to half of an original number of reference pixels.

7. A video encoding method used by a video encoding apparatus comprising an intra-frame prediction unit, which comprises a luminance reference pixel subsampling unit, a luminance reference pixel acquisition unit, a chrominance reference pixel subsampling unit, a chrominance reference pixel acquisition unit, a prediction coefficient derivation unit, and a chrominance linear prediction unit, and which is configured to encode a video comprising a plurality of color components, wherein the video encoding method comprises:

first processing in which the luminance reference pixel subsampling unit subsamples reference pixels located neighboring a luminance block that corresponds to a chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the luminance block consecutively from the left;

second processing in which the luminance reference pixel acquisition unit acquires pixel values of the reference pixels after the subsampling by means of the luminance reference pixel subsampling unit;

third processing in which the chrominance reference pixel subsampling unit subsamples the reference pixels located neighboring the chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the chrominance prediction target block consecutively from the left;

fourth processing in which the chrominance reference pixel acquisition unit acquires pixel values of the reference pixels after the subsampling by means of the chrominance reference pixel subsampling unit;

fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit, wherein the luminance reference pixel subsampling unit and the chrominance reference pixel subsampling unit each perform the subsampling processing only when a smallest coding unit prepared beforehand is selected as a coding unit.

8. A video decoding method used by a video decoding apparatus comprising an intra-frame prediction unit, which comprises a luminance reference pixel subsampling unit, a luminance reference pixel acquisition unit, a chrominance reference pixel subsampling unit, a chrominance reference pixel acquisition unit, a prediction coefficient derivation unit, and a chrominance linear prediction unit, and which is configured to decode a video comprising a plurality of color components, wherein the video decoding method comprises:

first processing in which the luminance reference pixel subsampling unit subsamples reference pixels located neighboring a luminance block that corresponds to a chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the luminance block consecutively from the left;

second processing in which the luminance reference pixel acquisition unit acquires pixel values of the reference pixels after the subsampling by means of the luminance reference pixel subsampling unit;

third processing in which the chrominance reference pixel subsampling unit subsamples the reference pixels located neighboring the chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the chrominance prediction target block consecutively from the left;

fourth processing in which the chrominance reference pixel acquisition unit acquires pixel values of the reference pixels after the subsampling by means of the chrominance reference pixel subsampling unit;

fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit, wherein the luminance reference pixel subsampling unit and the chrominance reference pixel subsampling unit each perform the subsampling processing only when a smallest coding unit prepared beforehand is selected as a coding unit.

9. A computer program product including a non-transitory computer readable medium storing a program which, when executed by a computer, causes the computer to perform a video encoding method used by a video encoding apparatus comprising an intra-frame prediction unit, which comprises a luminance reference pixel subsampling unit, a luminance reference pixel acquisition unit, a chrominance reference pixel subsampling unit, a chrominance reference pixel acquisition unit, a prediction coefficient derivation unit, and a chrominance linear prediction unit, and which is configured to encode a video comprising a plurality of color components, wherein the video encoding method comprises:

first processing in which the luminance reference pixel subsampling unit subsamples reference pixels located neighboring a luminance block that corresponds to a chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the luminance block consecutively from the left;

second processing in which the luminance reference pixel acquisition unit acquires pixel values of the reference pixels after the subsampling by means of the luminance reference pixel subsampling unit;

third processing in which the chrominance reference pixel subsampling unit subsamples the reference pixels located neighboring the chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the chrominance prediction target block consecutively from the left;

fourth processing in which the chrominance reference pixel acquisition unit acquires pixel values of the reference pixels after the subsampling by means of the chrominance reference pixel subsampling unit;

fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit, wherein the luminance reference pixel subsampling unit and the chrominance reference pixel subsampling unit each perform the subsampling processing only when a smallest coding unit prepared beforehand is selected as a coding unit.

10. A computer program product including a non-transitory computer readable medium storing a program which, when executed by a computer, causes the computer to perform a video decoding method used by a video decoding apparatus comprising an intra-frame prediction unit, which comprises a luminance reference pixel subsampling unit, a luminance reference pixel acquisition unit, a chrominance reference pixel subsampling unit, a chrominance reference pixel acquisition unit, a prediction coefficient derivation unit, and a chrominance linear prediction unit, and which is configured to decode a video comprising a plurality of color components, wherein the video decoding method comprises:

first processing in which the luminance reference pixel subsampling unit subsamples reference pixels located neighboring a luminance block that corresponds to a chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the luminance block consecutively from the left;

second processing in which the luminance reference pixel acquisition unit acquires pixel values of the reference pixels after the subsampling by means of the luminance reference pixel subsampling unit;

third processing in which the chrominance reference pixel subsampling unit subsamples the reference pixels located neighboring the chrominance prediction target block, the number of reference pixels is reduced to half of an original number of reference pixels adjacent to the left side or from the left side to the left by every other column consecutively from the uppermost, and the number of reference pixels is reduced to half of an original number of reference pixels adjacent to the upper side of the chrominance prediction target block consecutively from the left;

fourth processing in which the chrominance reference pixel acquisition unit acquires pixel values of the reference pixels after the subsampling by means of the chrominance reference pixel subsampling unit;

fifth processing in which the prediction coefficient derivation unit derives a prediction coefficient based on the pixel values acquired by the luminance reference pixel acquisition unit and the pixel values acquired by the chrominance reference pixel acquisition unit; and sixth processing in which the chrominance linear prediction unit calculates a predicted pixel value in a linear manner for each pixel that forms the chrominance prediction target block based on a local decoded pixel value of the luminance block that corresponds to the chrominance prediction target block and the prediction coefficient derived by the prediction coefficient derivation unit, wherein the luminance reference pixel subsampling unit and the chrominance reference pixel subsampling unit each perform the subsampling processing only when a smallest coding unit prepared beforehand is selected as a coding unit.

* * * * *